US012580698B2

(12) United States Patent
Harada et al.

(10) Patent No.: US 12,580,698 B2
(45) Date of Patent: Mar. 17, 2026

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 794 days.

(21) Appl. No.: 17/430,499

(22) PCT Filed: Feb. 14, 2019

(86) PCT No.: PCT/JP2019/005448
§ 371 (c)(1),
(2) Date: Apr. 6, 2022

(87) PCT Pub. No.: WO2020/166043
PCT Pub. Date: Aug. 20, 2020

(65) Prior Publication Data
US 2022/0263618 A1      Aug. 18, 2022

(51) Int. Cl.
H04L 5/00          (2006.01)

(52) U.S. Cl.
CPC .................................. H04L 5/0048 (2013.01)

(58) Field of Classification Search
CPC . H04L 5/0048; H04L 5/0023; H04L 27/2671;
H04L 27/2675; H04L 5/0051; H04L
5/0078; H04L 27/2666; H04L 27/2657;
H04L 27/2673; H04J 11/0069; H04J
11/0073; H04J 11/0076; H04W 56/0015;
H04W 56/00; H04W 74/0808; H04B
17/373
See application file for complete search history.

(56) References Cited

U.S. PATENT DOCUMENTS

| | | | | | |
|---|---|---|---|---|---|
| 11,991,111 | B2 * | 5/2024 | Mondal | ................. | H04L 5/0078 |
| 2020/0154341 | A1 * | 5/2020 | Sun | ........................ | H04L 5/0053 |
| 2020/0413356 | A1 * | 12/2020 | Wang | ................ | H04W 56/0015 |
| 2021/0007072 | A1 * | 1/2021 | Wu | ........................ | H04L 5/0053 |
| 2021/0120592 | A1 * | 4/2021 | Takahashi | ......... | H04W 74/0833 |

(Continued)

OTHER PUBLICATIONS

Extended European Search Report issued in counterpart European Patent Application No. 19915298.4, mailed on Aug. 25, 2022 (8 pages).

(Continued)

*Primary Examiner* — Kan Yuen

(74) *Attorney, Agent, or Firm* — Osha Bergman Watanabe & Burton LLP

(57)          ABSTRACT

To properly consider the QCL assumption about SSBs in an NR-U carrier, a user terminal according to one aspect of the present disclosure is characterized by having a receiving section that receives a Synchronization Signal Block (SSB), and a control section which acquires an effective SSB index based on a demodulation reference signal (DeModulation Reference Signal (DMRS)) of a broadcast channel (Physical Broadcast Channel (PBCH)) included in the SSB, and from a payload of the PBCH, acquires at least one of information on the number of effective SSB indexes to be transmitted and a start location index of an SSB burst including the SSB within a Discovery Reference Signal (DRS) transmission window.

4 Claims, 15 Drawing Sheets

(56) References Cited

U.S. PATENT DOCUMENTS

| | | | | |
|---|---|---|---|---|
| 2021/0329577 | A1* | 10/2021 | Jiang | H04W 72/23 |
| 2021/0368425 | A1* | 11/2021 | Bao | H04W 48/12 |
| 2021/0385826 | A1* | 12/2021 | Moon | H04L 1/0046 |
| 2022/0124647 | A1* | 4/2022 | Lee | H04W 56/006 |
| 2022/0124725 | A1* | 4/2022 | Lin | H04L 5/0082 |
| 2022/0394617 | A1* | 12/2022 | Li | H04W 52/0235 |

OTHER PUBLICATIONS

Office Action issued in the counterpart Japanese Patent Application No. 2020-572024, mailed on Sep. 27, 2022 (9 pages).

Charter Communications; "Feature lead summary #1 of Enhancements to initial access procedure", 3GPP TSG RAN WG1 Meeting Ad Hoc 1901, R1-1901347, Taipei, Taiwan, Jan. 21-25, 2019 (13 pages).

LG Electronics; "Initial access and mobility for NR unlicensed operation", 3GPP TSG RAN WG1 Meeting #95, R1-1812561, Spokane, USA, Nov. 12-16, 2018 (18 pages).

Qualcomm Incorporated; "Feature lead summery on initial access signals and channels for NR-U", 3GPP TSG RAN WG1 Meeting AH1901, R1-1901332, Taipei, Taiwan, Jan. 21-25, 2019 (31 pages).

Motorola Mobility, Lenovo; "DRS design for NR-U", 3GPP TSG RAN WG1 Meeting #AH1901, R1-1900937, Taipei, Jan. 21-25, 2019 (5 pages).

Office Action issued in Korean Application No. 10-2021-7026623, dated Oct. 30, 2023 (8 pages).

Office Action issued in Chinese Application No. 201980095413.3, dated Nov. 30, 2023 (15 pages).

International Search Report issued in PCT/JP2019/005448 on Apr. 9, 2019 (5 pages).

Written Opinion issued in PCT/JP2019/005448 on Apr. 9, 2019 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

NTT DOCOMO, Inc., "Enhancements to initial access procedure for NR-U", 3GGP TSG RAN WG1 Ad-Hoc Meeting 1901, R1-1900954, Taipei, Taiwan, Jan. 21-25, 2019 (9 pages).

Vivo, "Views on NR-PBCH contents and payload size", 3GGP TSG RAN WG1 NR Ad-Hoc Meeting #2, R1-1710375, Qingdao, P.R. China, Jun. 27-30, 2017 (6 pages).

Office Action issued in European Application No. 19915298.4, dated Jun. 26, 2023 (5 pages).

Office Action issued in Chinese Application No. 201980095413.3, dated Jun. 15, 2023 (14 pages).

Office Action issued in European Patent Application No. 19915298. 4, dated Sep. 4, 2024 (6 pages).

Decision of Refusal issued for KR10-2021-7026623, dated Aug. 13, 2024 (8 pages).

* cited by examiner

USER TERMINAL AND RADIO COMMUNICATION METHOD

TECHNICAL FIELD

The present disclosure relates to a user terminal and radio communication method in the next-generation mobile communication system.

BACKGROUND ART

In Universal Mobile Telecommunications System (UMTS) networks, for the purpose of higher data rates, low delay and the like, Long Term Evolution (LTE) has been specified (Non-patent Document 1). Further, for the purpose of higher capacity, more sophistication and the like than LTE (Third Generation Partnership Project (3GPP) Release (Rel.) 8, 9), LTE-Advanced (3GPP Rel. 10-14) has been specified.

Successor systems (e.g., also referred to as 5th generation mobile communication system (5G), 5G+(plus), New Radio (NR), 3GPP Rel.15 onward, etc.) to LTE have also been studied.

In the existing LTE system (e.g., Rel.8-12), specifications were made on the assumption that exclusive operation is performed in a licensed frequency band (also referred to as a licensed band, licensed carrier, licensed component carrier (licensed CC), etc.) of a telecommunications carrier (operator). As the licensed CC, for example, 800 MHz, 1.7 GHz, 2 GHz and the like are used.

Further, in the existing LTE system (e.g., Rel. 13), in order to extend the frequency band, the system supports use of a frequency band (also referred to as an unlicensed band, unlicensed carrier, unlicensed CC) different from the above-mentioned licensed band. For example, as the unlicensed band, a 2.4 GHz-band, 5 GHz-band and the like are assumed where it is possible to use Wi-Fi (Registered Trademark) and Bluetooth (Registered Trademark).

Rel.13 supports Carrier Aggregation (CA) for aggregating a carrier (CC) of the licensed band and a carrier (CC) of the unlicensed band. Communication thus using the unlicensed band together with the licensed band is referred to as License-Assisted Access (LAA).

CITATION LIST

Non-Patent Literature

[Non-patent Literature 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

Also in NR, it is studied to use the unlicensed band. Before transmission of data in the unlicensed band, listening (also called Listen Before Talk (LBT), etc.) is performed.

Further, NR uses Synchronization Signal (SS)/Physical Broadcast CHannel (PBCH) block (SS block (SSB)). A user terminal (e.g., User Equipment (UE)) may be configured for a higher layer parameter (for example, which may be called a Radio Resource Control (RRC) parameter "ssb-PositionsInBurst) about a transmission unit (which may be called an SS burst, SS burst set, simply burst and the like) of some collected SSBs.

However, in the case of notifying of the SSB that is semi-statically transmitted using ssb-PositionsInBurst, studies have not proceeded yet on that a UE suitably judges Quasi-Co-Location (QCL) assumption between SSB indexes in consideration of an LBT failure. Further, studies have not proceeded yet either on that a UE suitably judges the QCL assumption between SSB indexes in consideration of an LBT failure in the case where it is not possible to use the ssb-PositionsInBurst. Unless the studies are distinctly defined, since the UE is not capable of suitably monitoring a PDCCH and the like, there is the risk that communication throughput is decreased.

Therefore, in the present disclosure, it is an object to provide a user terminal and radio communication method for enabling the QCL assumption about SSBs in the NR-U carrier to be properly considered.

Solution to Problem

A user terminal according to one aspect of the present disclosure is characterized by having a receiving section that receives a Synchronization Signal Block (SSB), and a control section which acquires an effective SSB index based on a demodulation reference signal (DeModulation Reference Signal (DMRS)) of a broadcast channel (Physical Broadcast Channel (PBCH)) included in the SSB, and from a payload of the PBCH, acquires at least one of information on the number of effective SSB indexes to be transmitted and a start location index of an SSB burst including the SSB within a Discovery Reference Signal (DRS) transmission window.

Advantageous Effects of Invention

According to one aspect of the present disclosure, it is possible to properly consider the QCL assumption about the SSB in the NR-U carrier.

DESCRIPTION OF EMBODIMENTS

<Unlicensed Band>

Figure 1:
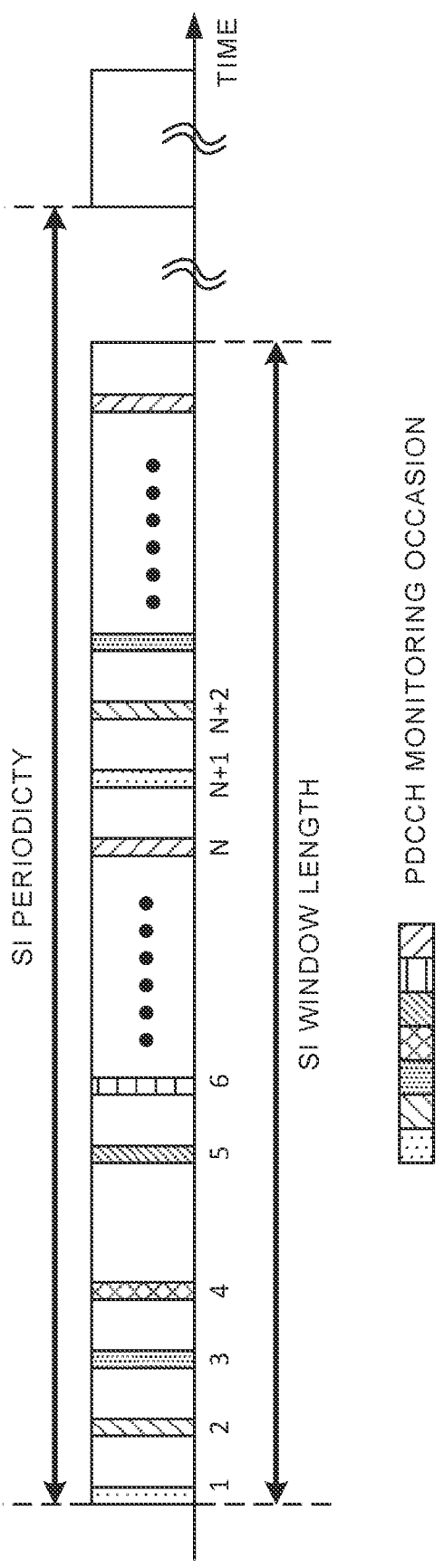
FIG. 1 is a diagram showing one example of a relationship between PDCCH monitoring occasions for OSI and SSBs in Rel-15 NR.

In the unlicensed band (e.g., 2.4 GHz-band, 5 GHz-band, 6 GHz-band), since coexistence of a plurality of systems is expected such as, for example, a Wi-Fi system and system (LAA system) for supporting LAA, it is considered that collision avoidance and/or interference control is necessary in transmission among the plurality of systems.

For example, in the Wi-Fi system using the unlicensed band, Carrier Sense Multiple Access (CSMA)/Collision Avoidance (CA) is adopted for the purpose of avoiding collision and/or controlling interference. In CSMA/CA, a predetermined time Distributed access Inter Frame Space (DIFS) is provided before transmission, and a transmitting apparatus performs data transmission after ascertaining (carrier sense) the absence of another transmission signal. Further, after transmitting the data, the transmitting apparatus waits for ACKnowledgement (ACK) from a receiving apparatus. In the case where the transmitting apparatus is not capable of receiving ACK within a predetermined time, the transmitting apparatus determines that a collision occurs, and performs retransmission.

In LAA of the existing LTE system (e.g., Rel.13), before transmitting data in the unlicensed band, a transmitting apparatus of the data performs listening (also called Listen Before Talk (LBT), Clear Channel Assessment (CCA), carrier sense, sensing of a channel, channel access procedure or the like) to ascertain the presence or absence of transmission of another apparatus (e.g., base station, user terminal, Wi-Fi apparatus, etc.).

For example, the transmitting apparatus may be a base station (e.g., gNodeB (gNB)) on downlink (DL), and may be a user terminal (e.g., User Equipment (UE)) on uplink (UL). Further, for example, the receiving apparatus that receives the data from the transmitting apparatus may be a UE on DL, and may be a base station on UL.

In LAA of the existing LTE system, the transmitting apparatus starts data transmission a predetermined time period (e.g., immediately after, or time period of back-off) later after detecting no transmission (idle state) of another apparatus in LBT.

An NR system using the unlicensed band may be called an NR-Unlicensed (U) system, NR LAA system and the like. In NR-U, there is a possibility of also adopting Dual Connectivity (DC) of the licensed band and the unlicensed band, Stand-Alone (SA) of the unlicensed band and the like.

In order to coexist with another system or another operator, after ascertaining that a channel is available (idle) by LBT, a node (e.g., base station, UE) in NR-U starts transmission.

In the NR-U system, in the case where the LBT result is idle (LBT-idle), the base station or UE acquires a Transmission Opportunity (TxOP) to perform transmission. In the case where the LBT result is busy (LBT-busy), the base station or the UE does not perform transmission. The time of the Transmission Opportunity is also called Channel Occupancy Time (COT).

In addition, LBT-idle may be read with LBT success. LBT-busy may be read with LBT failure.

<SSB>

Synchronization Signal/Physical Broadcast Channel (SS/PBCH) blocks are used in NR. The SS/PBCH block may be a signal block including a Primary Synchronization Signal (PSS), Secondary Synchronization Signal (SSS) and a broadcast channel (Physical Broadcast Channel (PBCH)) (and a demodulation reference signal (DeModulation Reference Signal (DMRS) for the PBCH). The SS/PBCH block may be called a Synchronization Signal Block (SSB).

In Rel-15 NR, PDCCH monitoring operation is defined to receive Other System Information (OSI) and paging. In addition, the OSI may correspond to system information except Remaining Minimum System Information (RMSI).

For example, in the case where an ID of search space for the OSI or paging is zero (i.e., in the case where the UE monitors a PDCCH for the OSI or paging in search space #0), a monitoring occasion of the PDCCH (PDCCH monitoring occasion) may be the same as a PDCCH monitoring occasion for System Information Block 1 (SIB1). A relationship (mapping) between the PDCCH monitoring occasion and an SSB index may be determined based on § 13 of 3GPP TS 38.213. The PDCCH monitoring occasion may be called a PDCCH monitoring time period and the like.

In the case where the ID of search space for the OSI or paging is not zero and a UE is in an IDLE/INACTIVE mode, the UE may determine a PDCCH monitoring occasion to monitor for the OSI or paging, based on a relationship between an actually transmitted SSB and the PDCCH monitoring occasion (e.g., § 7.1 of 3GPP TS 38.304, § 5 of TS 38.331 and the like).

FIG. 1 is a diagram showing one example of the relationship between the PDCCH monitoring occasion for the OSI and the SSB in Rel-15 NR.

A system information (SI) window length corresponds to a length of a window (time period) usable in scheduling of the SI, and for example, 5 slots, 10 slots, . . . , 1280 slots and the like may be configured on a UE by higher layer signaling.

In the present disclosure, for example, the higher layer signaling may be one of Radio Resource Control (RRC) signaling, Medium Access Control (MAC) signaling, broadcast information and the like, or combination thereof.

For example, the MAC signaling may use MAC Control Element (MAC CE), MAC Protocol Data Unit (PDU) and the like. For example, the broadcast information may be a Master Information Block (MIB), System Information Block (SIB), RMSI, OSI and the like.

A system information (SI) periodicity corresponds to a periodicity of an SI message on a radio-frame basis, and for example, 8 radio frames, 16 radio frames, . . . , 512 radio frames and the like may be configured on a UE by the higher layer signaling.

A UE may be configured for a higher layer parameter (for example, which may be called Radio Resource Control (RRC) parameter "ssb-PositionsInBurst") about a transmission unit of some collected SSBs. The transmission unit of the SSB may be called a transmission time interval of the SSB, SSB set, SS burst, SS burst set, simply burst and the like. The SS burst may mean a set of SSBs included in a predetermined time period (e.g., half-frame (0.5 radio frame)). The higher layer parameter may be called information (parameter) on positions in the time domain of SSBs transmitted within an SS burst. In the present disclosure, the higher layer parameter is described as ssb-PositionsInBurst, but the name is not limited thereto.

The ssb-PositionsInBurst may vary in size (bit length) corresponding to the frequency used in a serving cell. For example, the ssb-PositionsInBurst may be defined as 4 bits in frequencies of 3 GHz or 2.4 GHz or less, 8 bits in frequencies of 3 GHz or 2.4 GHz to 6 GHz, 64 bits in the other frequencies, and the like. In other words, the size of the ssb-PositionsInBurst may be 4 or 8 bits in the case where the SubCarrier Spacing (SCS) of the SSB is 15 kHz or 30 kHz, and 8 bits or more in the case where the SubCarrier Spacing of the SSB is 120 kHz or 240 kHz. As a matter of course, the frequency, SCS, the size of the ssb-PositionsInBurst and the like are not limited thereto.

The ssb-PositionsInBurst is a bitmap, and each bit indicates an SSB transmission candidate position within an SS burst such that the leftmost (first) bit corresponds to an SSB index #0, the second bit corresponds to an SSB index #1 and so on. A value "1" of the bit indicates that the corresponding SSB is transmitted, and "0" indicates that the corresponding SSB is not transmitted.

In addition, in the present disclosure, the SSB transmission candidate position may represent a position of a first symbol of the SSB candidate. The SSB index may indicate positions of the SSB per predetermined time period (e.g., half-frame (0.5 radio frame)).

In Frequency Range 1 (FR1), the SSB index may be represented by 3 bits at the maximum, or may be acquired by a UE using a sequence of the DMRS of the PBCH. In Frequency Range 2 (FR2), the SSB index may be represented by total 6 bits including lower 3 bits by the sequence of the DMRS of the PBCH and higher 3 bits by a payload of the PBCH, or may be acquired by a UE based thereon.

The UE may assume that SSBs that correspond to the same SSB index of the same cell is QCL. Further, the UE may not assume QCL about SSBs that correspond to different SSB indexes of the same cell.

FIG. 1 illustrates first, second, . . . , Nth, N+1th, . . . , PDCCH monitoring occasions within an SI window. The UE may assume that an x*N+Kth (herein, x=0, 1, . . . , X−1, and K=1, 2, . . . , N) PDCCH monitoring occasion corresponds to a Kth actually transmitted SSB.

In addition, X may be a minimum integer of a value or more obtained by dividing the number of monitoring occasions within the SI window by N. Further, N may correspond to the number of actually transmitted SSBs determined by ssb-PositionsInBurst (for example, when the ssb-PositionsInBurst is 8 bits, the number is "8" or less.)

With respect to PDCCH monitoring occasions related to the same SSB, the UE may assume the same Quasi-Co-Location (QCL). For example, in the first and N+1th PDCCH monitoring occasions in FIG. 1, the UE may assume the same QCL as the first SSB to be transmitted, and receive the PDCCH. The same shaded PDCCH monitoring occasions in FIG. 1 may represent that the same beam is applied (or the QCL with the same SSBs is assumed.) The different shaded PDCCH monitoring occasions in FIG. 1 may represent that different beams are applied respectively thereto (or the QCL with respective different SSBs is assumed.)

In addition, the QCL may be an indicator indicative of statistical properties of at least one (expressed as signal/channel) of a signal and a channel. For example, in the case where some signal/channel and another signal/channel are in the relationship of QCL, in between the different signals/channels, the case may mean that it is possible to assume that at least one of a Doppler shift, Doppler spread, average delay, delay spread and Spatial parameter (e.g., special reception parameter (Spatial Rx Parameter)) is the same (QCLed with respect to at least one of them).

It may be called a QCL assumption that a UE assumes that a predetermined control resource set (COntrol REsource SET: CORESET), channel or reference signal is in a particular QCL (e.g., QCL-Type D) relationship with another CORESET, channel or reference signal.

Figure 2:
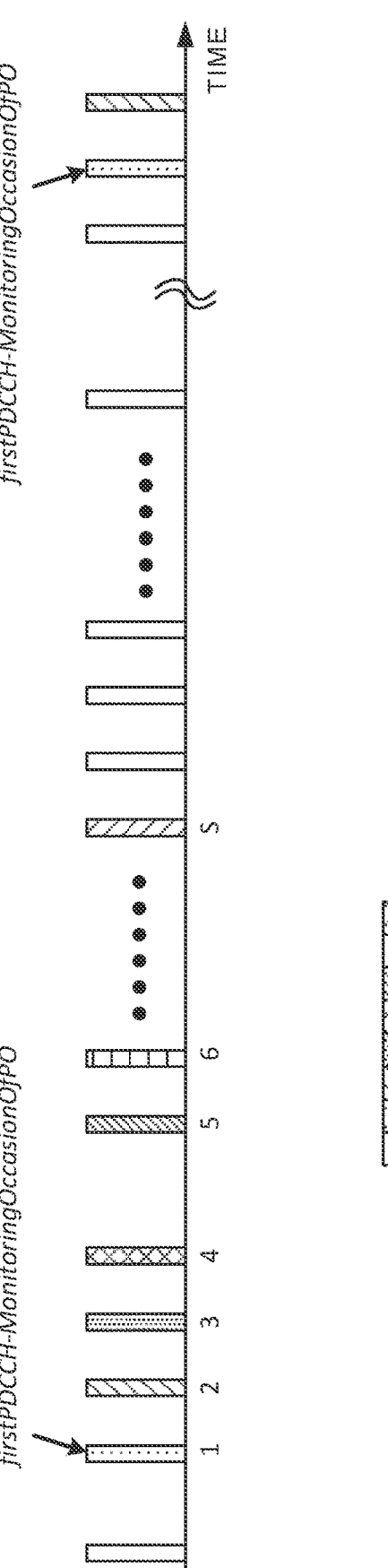
FIG. 2 is a diagram showing one example of a relationship between PDCCH monitoring occasions for paging and SSBs in Rel-15 NR.

FIG. 2 is a diagram showing one example of a relationship between PDCCH monitoring occasions for paging and the SSB in Rel-15 NR.

A start position of PDCCH monitoring for a paging frame (PR) and Downlink Control Information (DCI) for paging may be determined based on an ID of the UE. The PF may be defined using one or more radio frames.

The UE may be configured for a higher layer parameter (for example, which may be called RRC parameter "first PDCCH-Monitoring Occasion OfPO") about a first paging occasion (Paging Occasion (PO)) in the PF. In the present disclosure, the higher layer parameter is described as first PDCCH-Monitoring Occasion OfPO, but the name is not limited thereto.

In the case of configuring first PDCCH-Monitoring Occasion OfPO, the UE may assume that a time period of S PDCCH monitoring occasions among PDCCH monitoring occasions designated by the first PDCCH-Monitoring Occasion OfPO corresponds to the PO. At PDCCH monitoring occasions (shaded rectangular timings in FIG. 2) included in the PO, the UE may perform PDCCH monitoring for paging. In addition, rectangles that are not shaded in FIG. 2 may correspond to occasions for not performing PDCCH monitoring for paging among the PDCCH monitoring occasions.

FIG. 2 illustrates first, second, . . . , Sth PDCCH monitoring occasions within the PO. The UE may assume that the Kth PDCCH monitoring occasion in the PO corresponds to a Kth actually transmitted SSB. Herein, S may correspond to the number of actually transmitted SSBs determined by ssb-PositionsInBurst (for example, when the ssb-PositionsInBurst is 8 bits, the number is "8" or less.) The different shaded occasions in FIG. may represent that different beams are applied respectively (or the QCL with respective different SSBs is assumed.)

In addition, in the case where the ID of search space for the OSI or paging is not zero, and a UE is in a CONNECTED mode, the UE may monitor all configured PDCCH monitoring occasions, based on search space configuration configured by the higher layer signaling. In other words, in this case, the UE may particularly not assume the relationship between the PDCCH monitoring occasion to monitor and the SSB index.

<SSB of NR-U>

It is studied to use the SSB also in NR-U. Further, it is studied to use a signal including Channel State Information (CSI)-Reference Signal (RS), SSB burst set (set of SSBs) and CORESET and PDSCH associated with the SSB in a single contiguous burst signal. The signal may be called a discovery reference signal (Discovery Reference Signal (DRS), NR-U DRS, etc.), reference signal for discovery, Discovery Signal (DS) and the like.

The CORESET (PDCCH) associated with the above-mentioned SSB may be called Remaining Minimum System Information (RMSI)-CORESET, CORESET #0 and the like. The RMSI may be called SIB1. A PDSCH associated with the SSB may be a PDSCH (RMSI PDSCH) for carrying the RMSI, or may be a PDSCH scheduled using a PDCCH (DCI having Cyclic Redundancy Check (CRC) scrambled by System Information (SI)-Radio Network Temporary Identifier (RNTI)) within the RMSI-CORESET.

SSBs having different SSB indexes may be transmitted using different beams (base station transmission beams). The SSB, and RMSI PDCCH and RMSI PDSCH corresponding thereto may be transmitted using the same beam.

With respect to NR-U, in consideration of the case where it is not possible to transmit the SSB due to an LBT failure, it is studied to extend the transmission candidate position of the SSB. For example, in a time period (DRS transmission window) with a possibility of transmitting the DRS, it is studied to extend the SSB transmission candidate position, and transmit the SSB (beam) which is not capable of being transmitted due to the LBT failure, using a different transmission candidate position within the window.

In addition, a length of the DRS transmission window may be configured on the UE by the higher layer signaling, or may be defined by specifications. The DRS transmission window may be called a DRS transmission time interval, DRS transmission window time period and the like.

Figure 3:
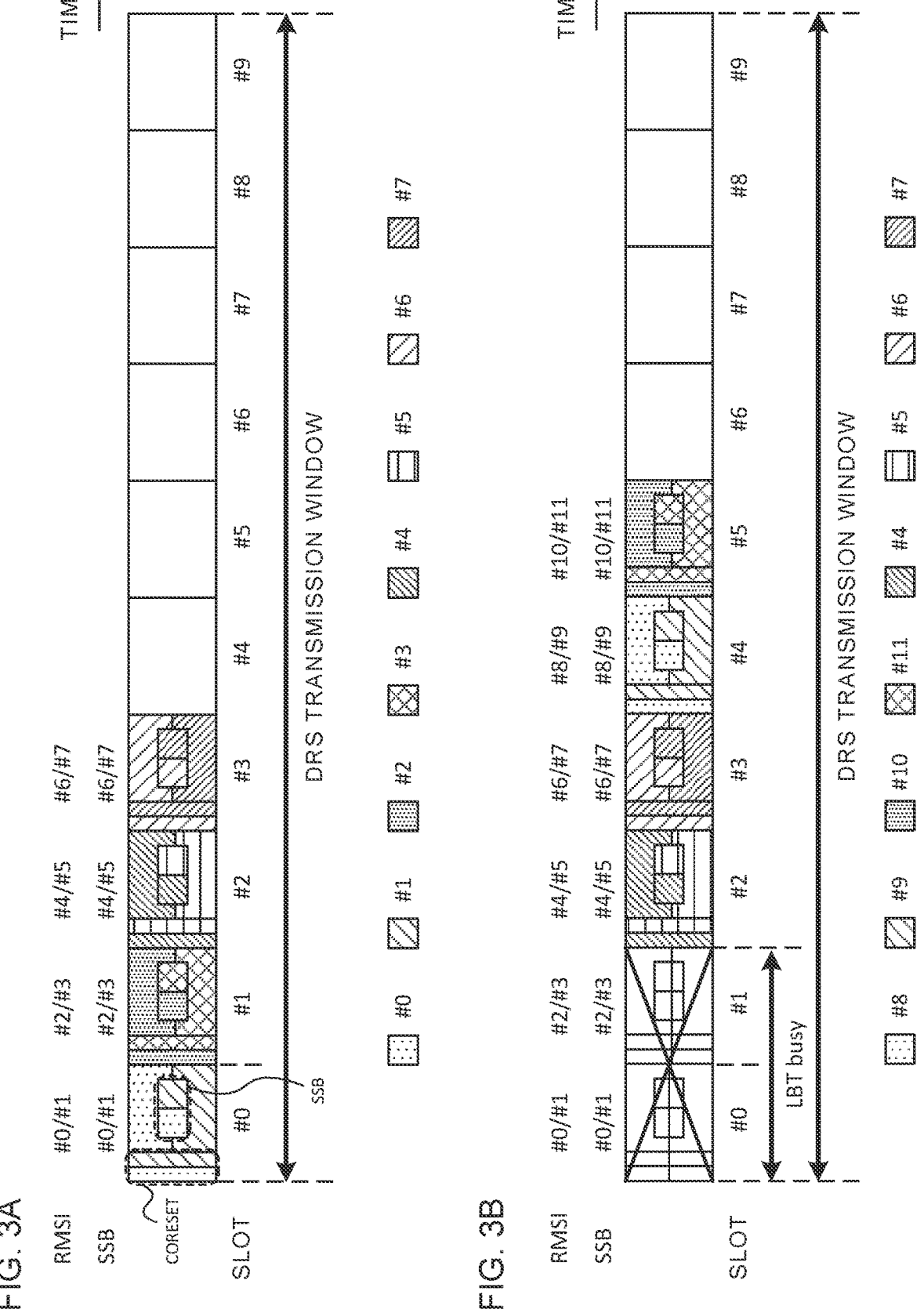
FIGS. 3A and 3B are diagrams showing one example of extension of an SSB transmission candidate position.

FIGS. 3A and 3B are diagrams showing one example of extension of the SSB transmission candidate position. In this example, it is assumed that SCS of a serving cell (or SSB) is 30 kHz, and that a slot length is 0.5 ms. Further, it is assumed that a length of the DRS transmission window is 5 ms. Also in the following drawings, similar SCS and DRS transmission window length are assumed. In addition, application of the present disclosure is not limited to these SCS and DRS transmission window length.

In FIG. 3A, the DRS is transmitted over 4 slots (slots #0 to #3). Herein, in the slot #0 of FIG. 3A are indicated CORESET (PDCCH) associated with the SSB, and PDSCH (portion except the SSB and CORESET) associated with the SSB. Mapping may be the same as in the other slots. In FIG. 3A, the SSB #i (i=0 to 7) and RMSI #i (PDCCH/PDSCH) may be transmitted using the same beam.

FIG. 3B illustrates the case where it is not possible to transmit slots #0 and #1 of FIG. 3A due to LBT-busy (LBT failure). In this case, the UE may assume that beams of SSBs # to #3 that are not transmitted are transmitted in slots subsequent to SSBs #4 to #7, using SSBs #8 to #11, respectively.

In other words, in this example, the PDCCH monitoring occasions for the RMSI are associated with SSB indexes that respectively correspond to SSB candidate positions within the DRS window.

Figure 4:
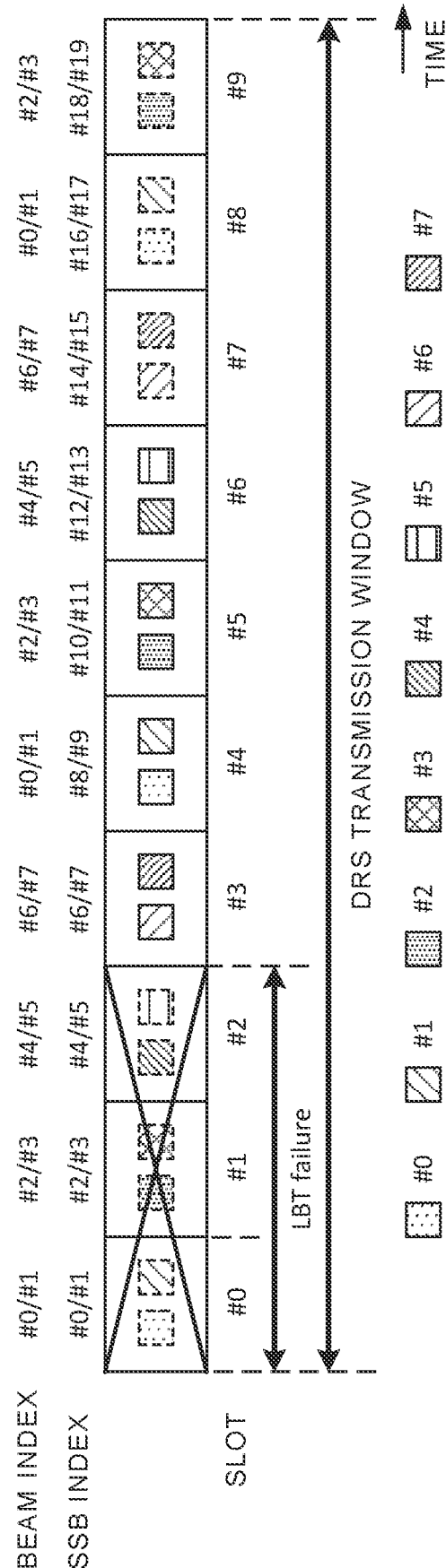
FIG. 4 is a diagram showing another example of extension of the SSB transmission candidate position.

FIG. 4 is a diagram showing another example of extension of the SSB transmission candidate position. This example illustrates the case where the number of transmission SSBs is "8" and is the same as the number of beams (the number of beams is also "8" (beam indexes #0 to #7).) In this case, a beam index #k corresponds to an SSB index #8i+k (i=0, 1, 2).

In addition, as described above, in Rel-15 NR, the RRC parameter referred to as ssb-PositionsInBurst is used to notify of the actually transmitted SSB index. However, in NR-U, as shown in FIGS. 3B and 4, the SSB is sometimes transmitted to a UE in a position (different SSB index) different from the SSB candidate position configured semi-statically by the ssb-PositionsInBurst. Further, for each DRS transmission time interval, the actually transmitted SSB index may vary.

Further, in NR-U, in order to support Stand-Alone operation, it is also studied to receive the OSI, paging and the like using NR-U carriers. As shown in FIGS. 1 and 2, in Rel-15

NR, in the case of using except search space zero in the idle/inactive mode, the PDCCH monitoring occasion is determined based on the relationship with the actually transmitted SSB index. However, also in the case where actual transmission is performed in the SSB candidate position extended by the LBT failure, the UE determines a position of the transmitted SSB index by the ssb-PositionsInBurst. The relationship is not obvious in between the extended SSB index that is not expressed by the ssb-PositionsInBurst and the PDCCH monitoring time period.

Furthermore, in Frequency Range 1 (FR1) of NR that has been studied previously, although it is possible to use 4 or up to 8 SSBs at the maximum, it is also considered that the actually transmitted SSBs are lower in number. For example, in the case of using the QCL assumption based on the premise that the number of transmission SSBs is "8" as shown in FIG. 4, when the number of actually transmitted SSBs is less than "8", candidate positions (candidate resources, candidate SSB indexes) for usable SSBs are limited.

Still furthermore, with respect to the SSB of NR that has been studied previously, up to two SSBs are allocated to a slot, and for flexible control, it is also considered to use only one SSB for each slot. Unless it is defined clearly how to handle SSB candidate indexes that are not used (for example, which SSB index is capable of being assumed to be QCL), operation of the base station, UE and the like is unclear.

Figure 5:
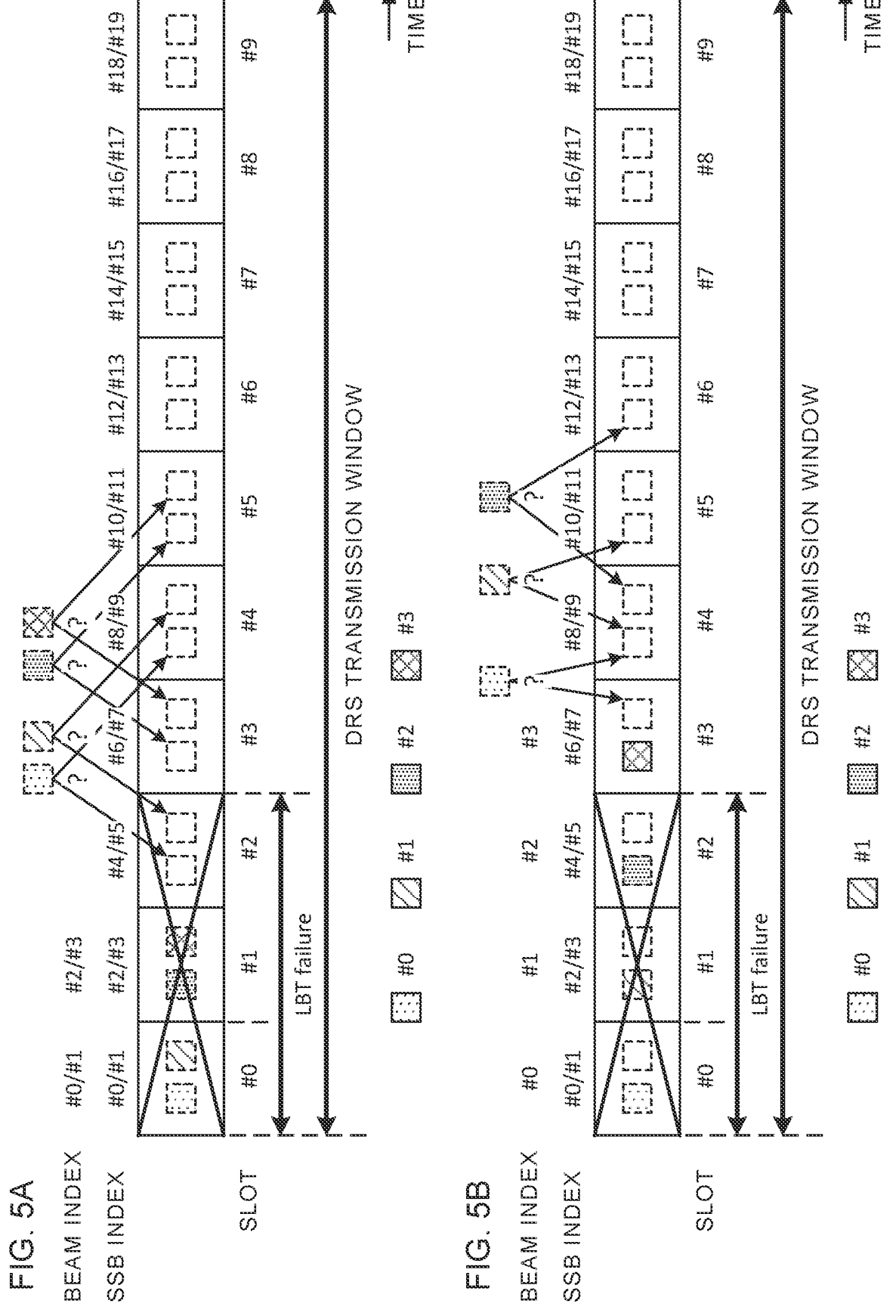
FIGS. 5A and 5B are diagrams showing one example of the problem with QCL assumption of the SSB.

These problems will be described with reference to FIGS. 5A and 5B. FIGS. 5A and 5B are diagrams showing one example of the problem with QCL assumption of the SSB.

FIG. 5A corresponds to the case where the number of SSBs (the number of beams) is less than "8". In this example, the ssb-PositionsInBurst indicates SSB indexes #0 to #3, and beam indexes #0 to #3 correspond to the SSB indexes #0 to #3.

In this example, slots #0 to #2 are not transmitted due to an LBT failure. It is the problem which SSB transmission candidate positions are used to transmit the beam indexes #0 to #3 that correspond to the SSB indexes #0 to #3 which are scheduled to transmit in slots #0 and #1. In using a fixed relation that corresponds to 8 SSBs as shown in FIG. 4, although the beam indexes #0 to #3 correspond to SSB indexes #8 to #11, it is not possible to use SSB indexes #4 to #7. It is required to define the QCL assumption for enabling vacant candidate SSB indexes to be used without waste.

FIG. 5B corresponds to the case where the number of SSBs (the number of beams) per slot is "1". In this example, ssb-PositionsInBurst indicates SSB indexes #0, #2, #4 and #6, and beam indexes #0 to #3 correspond to the SSB indexes #0, #2, #4 and #6, respectively.

In this example, slots #0 to #2 are not transmitted due to an LBT failure. It is the problem which SSB transmission candidate positions are used to transmit beam indexes #0 to #2 that correspond to SSB indexes #0, #2 and #4 which are scheduled to transmit in the slots #0 to #2. A case is considered where the beam indexes #0 to #2 are respectively transmitted using SSB indexes #7 to #9 immediately after an SSB index #6, and another case is also considered that transmission is performed using SSB indexes #8, #10 and #12 so as to maintain that the number of SSBs per slot is "1". In specifications that have been studied previously, it is not possible to identify either of the cases.

Thus, in the case of notifying of the SSB that is semi-statically transmitted using ssb-PositionsInBurst, studies have not proceeded yet on that a UE suitably judges the QCL assumption between SSB indexes in consideration of an LBT failure. Further, studies have not proceeded yet either on that a UE suitably judges the QCL assumption between SSB indexes in consideration of an LBT failure in the case where it is not possible to use the ssb-PositionsInBurst. Unless the studies are distinctly defined, since the UE is not capable of suitably monitoring a PDCCH and the like, there is the risk that communication throughput is decreased.

Therefore, the inventors of the present invention conceived a method for clarifying the QCL assumption between SSB indexes (SSB transmission candidate positions) in the NR-U carrier, and actualizing operation using the SSB properly also in the case where the SSB index (position) transmitted in a predetermined beam varies corresponding to an LBT result.

Embodiments according to the present disclosure will be described below in detail with reference to drawings. A radio communication method according to each of the Embodiments may be applied alone, or may be applied in combination.

In addition, in the present disclosure, an SSB that corresponds to an SSB index is simply called the SSB index also. Further, a beam that corresponds to a beam index is simply called the beam index also.

In addition, the beam index may correspond to a set of SSB indexes for enabling the QCL assumption to be performed within a DRS transmission window. Therefore, the beam index may be read with an effective SSB index. On the other hand, an SSB index for simply indicating the SSB candidate position within a DRS transmission window may be read with an SSB position index, location index and the like.

Further, NR-U of the present disclosure is not limited to LAA, and may include the case of using an unlicensed band in a Stand-Alone manner.

(Radio Communication Method)

Embodiment 1

In Embodiment 1, the QCL assumption between SSB indexes in the NR-U carrier may be determined by specifications and higher layer signaling. For example, a UE may assume that each SSB index up to slots including an SSB that corresponds to a maximum SSB index indicated by a predetermined higher layer parameter (e.g., ssb-PositionsIn-Burst) is QCLed with an SSB that corresponds to an SSB index in a slot subsequent to the slots in the same order.

Figure 6:
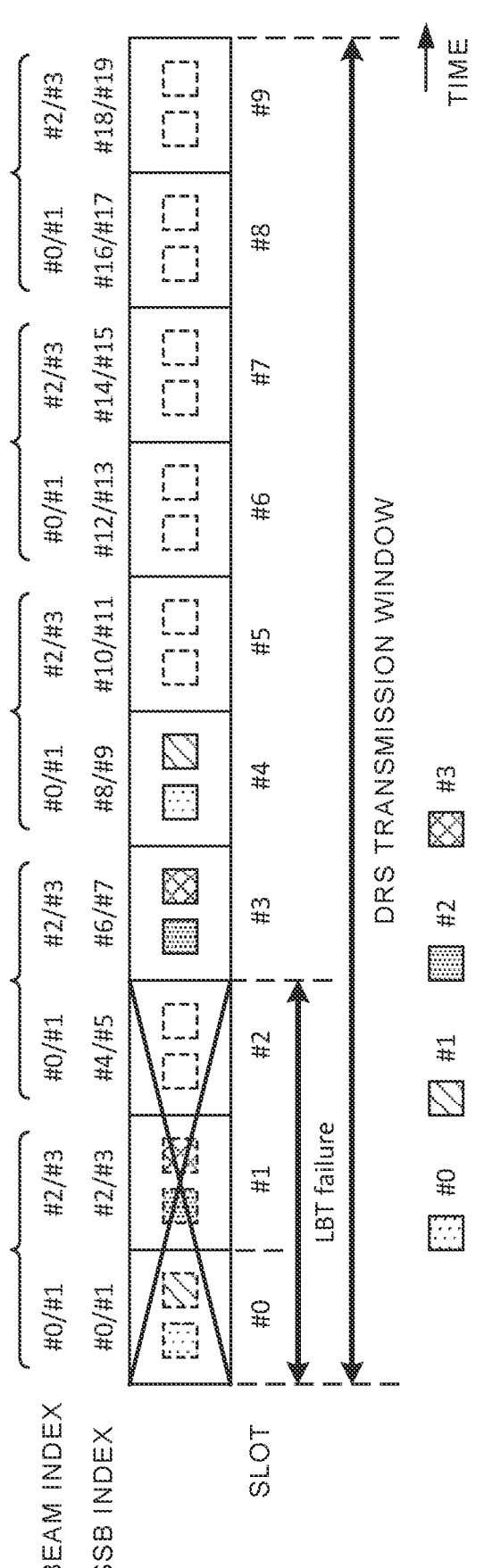
FIG. 6 is a diagram showing one example of the QCL assumption between SSB indexes in one Embodiment.

FIG. 6 is a diagram showing one example of the QCL assumption between SSB indexes in Embodiment 1. In this example, ssb-PositionsInBurst indicates SSB indexes #0 to #3 i.e. the case is shown where the maximum SSB index indicated by the ssb-PositionsInBurst is "3".

In this case, beam indexes #0 to #3 correspond to the SSB indexes #0 to #3. The UE may assume that SSB indexes #4i to #4i+3 (i is a natural number) are QCLed with the SSB indexes #0 to #3, respectively. In other words, in this example, since the maximum SSB index indicated by the ssb-PositionsInBurst corresponds to a last SSB in some slot, repetition of beams is divided by the slot, and is suitable for control.

In this example, slots #0 to #2 are not transmitted due to an LBT failure. Beam indexes #0 to #3 that correspond to SSB indexes #0 to #3 scheduled to be transmitted in slots #0 and #1 may be transmitted in slots #3 and #4 (SSB indexes #6 to #9) within the same DRS transmission window.

The UE may assume that SSB indexes #6, #7, #8 and #9 are QCLed with SSB indexes #2, #3, #0 and #1, respectively.

In other words, the UE may assume that the SSB indexes #6, #7, #8 and #9 are transmitted using beam indexes #2, #3, #0 and #1, respectively.

Figure 7:
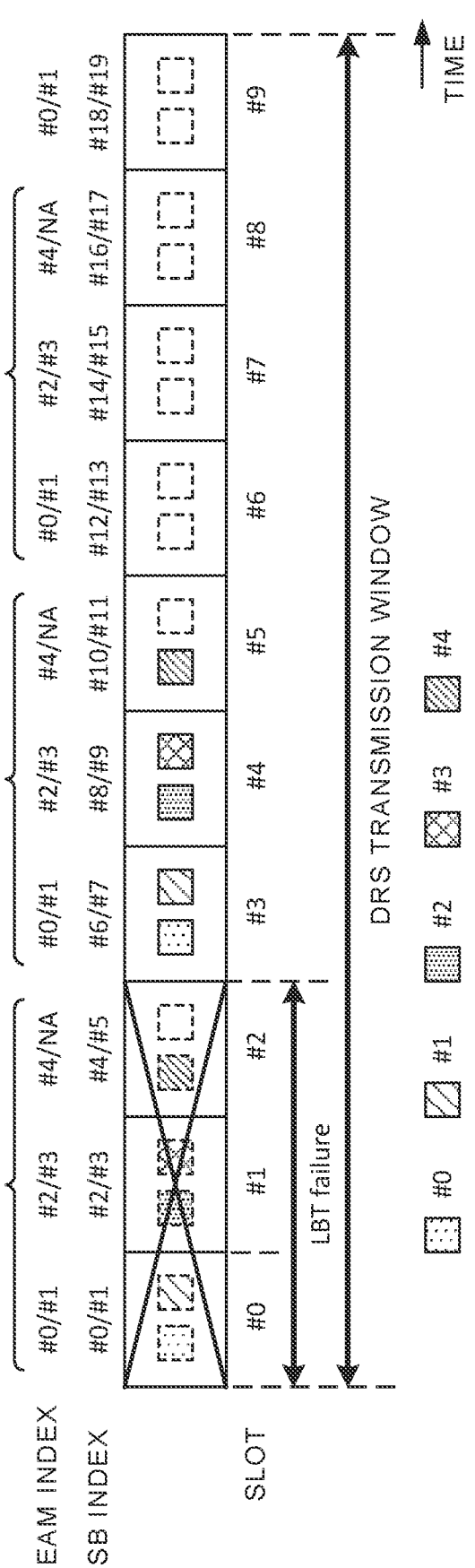
FIG. 7 is a diagram showing another example of the QCL assumption between SSB indexes in one Embodiment.

FIG. 7 is a diagram showing another example of the QCL assumption between SSB indexes in Embodiment 1. In this example, ssb-PositionsInBurst indicates SSB indexes #0 to #4 i.e. the case is shown where the maximum SSB index indicated by the ssb-PositionsInBurst is "4".

In this case, beam indexes #0 to #4 correspond to the SSB indexes #0 to #4. The UE may assume that an SSB index #5 included in the same slot as the SSB index #4 that is the maximum SSB index indicated by the ssb-PositionsInBurst is Not Available/Not Applicable (NA), and may not count as the number of actually transmitted SSBs.

The UE may assume that SSB indexes #6i to #6i+4 (i is a natural number) are QCLed with the SSB indexes #0 to #4, respectively. The UE may assume that an SSB index #6i+5 is NA in the same manner as the SSB index #5. In other words, in this example, even when the maximum SSB index indicated by the ssb-PositionsInBurst does not correspond to a last SSB in some slot, it is possible to divide repetition of beams by the slot, and the example is suitable for control.

In this example, slots #0 to #2 are not transmitted due to an LBT failure. The beam indexes #0 to #4 that correspond to the SSB indexes #0 to #4 scheduled to be transmitted in the slots #0 to #2 may be transmitted in slots #3 to #5 (SSB indexes #6 to #10) within the same DRS transmission window.

The UE may assume that SSB indexes #6, #7, #8, #9 and #10 are QCLed with the SSB indexes #0, #1, #2, #3 and #4, respectively. In other words, the UE may assume that the SSB indexes #6, #7, #8, #9 and #10 are transmitted using the beam indexes #0, #1, #2, #3 and #4, respectively.

Figure 8:
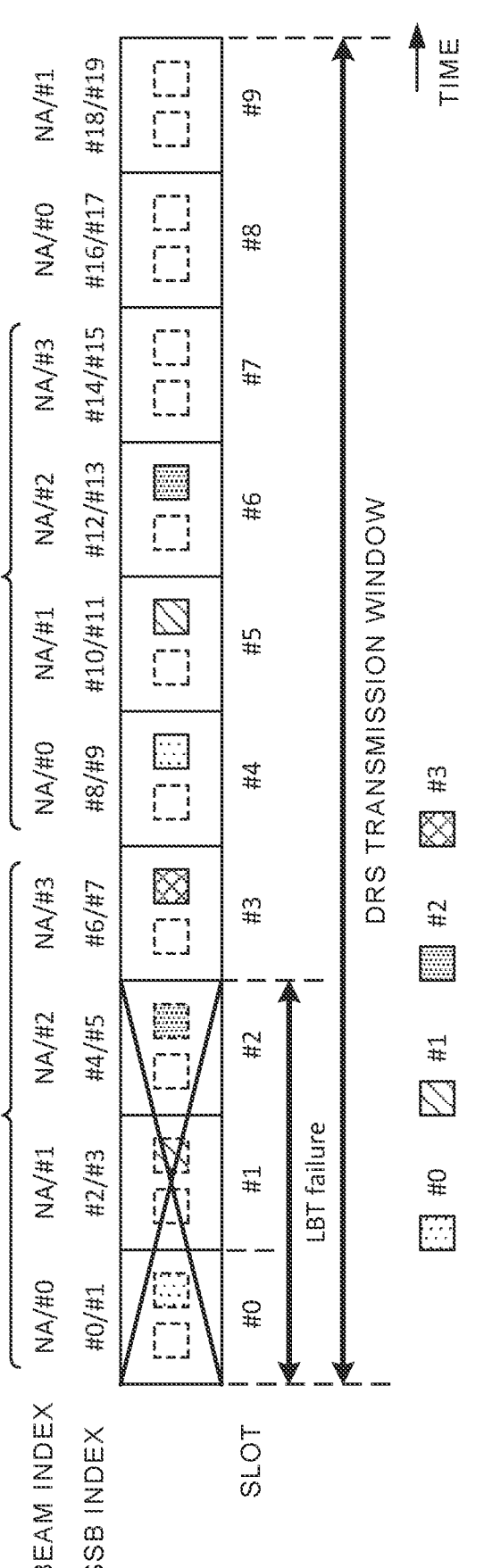
FIG. 8 is a diagram showing still another example of the QCL assumption between SSB indexes in one Embodiment.

FIG. 8 is a diagram showing still another example of the QCL assumption between SSB indexes in Embodiment 1. In this example, ssb-PositionsInBurst indicates SSB indexes #1, #3, #5 and #7 i.e. the case is shown where the maximum SSB index indicated by the ssb-PositionsInBurst is "7".

In this case, beam indexes #0, #1, #2 and #3 correspond to the SSB indexes #1, #3, #5 and #7, respectively. The UE may assume that off (corresponding to "0") SSB indexes #0, #2, #4 and #6 are Not Available (NA) among up to the SSB index #7 that is the maximum SSB index indicated by the ssb-PositionsInBurst, and may not count as the number of actually transmitted SSBs.

The UE may assume that SSB indexes #8i+1, #8i+3, #8i+5 and #8i+7 are QCLed with the SSB indexes #1, #3, #5 and #7, respectively. The UE may assume that SSB indexes #8i, #8i+2, #8i+4 and #8i+6 are NA in the same manner as the SSB indexes #0, #2, #4 and #6. In other words, in this example, it is possible to prevent an arbitrary SSB index from being considered QCLed with an NA SSB index.

In this example, slots #0 to #2 are not transmitted due to an LBT failure. The SSB index #7 of a slot #3 is transmitted using the beam index #3. The beam indexes #0, #1 and #2 that correspond to the SSB indexes #1, #3 and #5 scheduled to be transmitted in the slots #0 to #2 may be transmitted in slots #4 to #6 (SSB indexes #9, #11 and #13) within the same DRS transmission window.

The UE may assume that the SSB indexes #9, #11 and #13 are QCLed with the SSB indexes #1, #3 and #5, respectively. In other words, the UE may assume that SSB indexes #7, #9, #11 and #13 are transmitted using beam indexes #3, #0, #1 and #2, respectively.

In addition, in Embodiment 1, the UE may assume that each SSB index up to a predetermined time period (e.g., at least one of a subframe, half-slot, symbol and the like)

including an SSB that corresponds to the maximum SSB index indicated by the ssb-PositionsInBurst is QCLed with an SSB that corresponds to an SSB index subsequent to the predetermined time period in the same order.

In addition, in Embodiment 1, SSB transmission candidate positions in the NR-U carrier may exist in all slots within a predetermined time period (e.g., half-frame with a length of 5 ms). With respect to the SSB transmission candidate position, the candidate position may be defined beyond the predetermined time period (e.g., up to 6 ms).

For example, in the case where it is possible to configure a time period of a DRS transmission window on a UE by higher layer signaling, the SSB transmission candidate positions and SSB indexes may be defined with respect to all slots within the time period of the configured DRS transmission window.

Herein, as the SSB transmission candidate position within a slot, at least one of cases A, B, C, D and E defined in TS 38.213 § 4.1 Cell search of 3GPP Rel-15 may be used based on SCS, or other candidate positions may be used.

In addition, the cases A and C may correspond to a case where 2 SSBs in a slot are not contiguous (separate) in the time domain. The case A may be used for 15 kHz SCS. The case C may be used for 30 kHz SCS. The case B may correspond to a case where 2 SSBs in a slot are contiguous in the time domain. The case B may be used for 30 kHz SCS.

In addition, with respect to 30 kHz SCS, the used case (e.g., at least one of the cases B and C) may be defined by specifications, or may be notified using higher layer signaling, physical layer signaling or combination thereof.

A part of SSB transmission candidate positions may be Not Available. For example, as shown in FIGS. 7 and 8, an SSB index bypassed in ssb-PositionsInBurst (i.e., SSB index of a bit which corresponds to "0" and corresponds to a bit subsequent thereto of "1") and another SSB index QCLed with the SSB index may be assumed to be Not Available. Further, an SSB index of a bit which corresponds to "0" in ssb-PositionsInBurst and corresponds to a bit of the same slot as the maximum SSB index may be assumed to be Not Available.

In Embodiment 1, in monitoring operation of a PDCCH for paging in the NR-U carrier, PO may include the same number of PDCCH monitoring occasions as the number of all effective SSB transmission candidate positions. In other words, the number S of PDCCH monitoring occasions within the PO described above in relation to FIG. 2 may be read with the number of the effective SSB transmission candidate positions.

Herein, the effective SSB transmission candidate positions may be SSB indexes of which transmission is indicated by ssb-PositionsInBurst, and SSB indexes assumed to be QCLed with the SSB indexes included in the DRS transmission window.

In other words, the number of the effective SSB transmission candidate positions may be the total number of the number of SSB indexes of which transmission is indicated by ssb-PositionsInBurst, and the number of SSB indexes assumed to be QCLed with the SSB indexes included in the DRS transmission window.

Such a number will be described using FIG. 7 as an example. In the case of FIG. 7, the number of SSB indexes of which transmission is indicated by ssb-PositionsInBurst is "5" of SSB indexes #0 to #4. Further, SSB indexes that are QCLed with the SSB indexes #0 to #4 within the DRS transmission window are SSB indexes #6 to #10, #12 to #16, #18 and #19, and the number of the SSB indexes is "12".

Accordingly, the number of effective SSB transmission candidate positions (effective SSB indexes) is "17".

Figure 9:
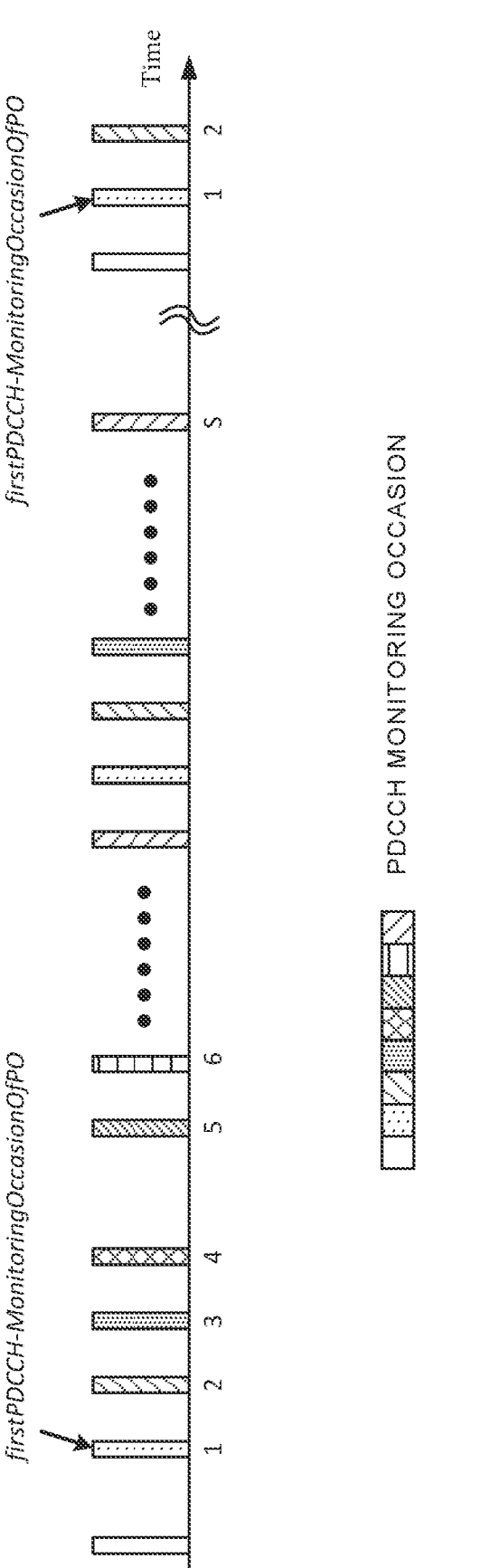
FIG. 9 is a diagram showing one example of a relationship between PDCCH monitoring occasions for paging and SSBs in one Embodiment.

FIG. 9 is a diagram showing one example of a relationship between PDCCH monitoring occasions for paging and the SSB in Embodiment 1. In FIG. 2, S PDCCH monitoring occasions respectively correspond to different beams, and in contrast thereto, FIG. 9 illustrates the case where S PDCCH monitoring occasions include PDCCH monitoring occasions that correspond to the same beam (based on the same QCL assumption), and in this respect, is different from FIG. 2.

According to Embodiment 1 described above, it is possible to properly judge the QCL assumption between SSB indexes.

Embodiment 2

The above-mentioned ssb-PositionsInBurst is notified to the UE using SIB1 or RRC signaling. Therefore, in the case where it is not possible to use the ssb-PositionsInBurst (e.g., initial access time), in the above-mentioned method, it is difficult to assume QCL about between different SSB candidate positions.

Further, in the case of supporting "8" or more as the number of SSB candidate positions (or, in a cell using "8" or more), it is studied that a UE acquires indexes specific to SSB candidate positions as SSB indexes using a combination of a DMRS (or DMRS sequence) and payload of a PBCH.

In specifications of NR that have been studied previously, in order for a UE to report measurement of power, quality (e.g., Synchronization Signal Reference Signal Received Power (SS-RSRP)) or the like of a neighbor cell in Radio Resource Management (RRM) measurement, there is the case where the UE is required to acquire an SSB index of each neighbor cell. In consideration of a UE load, measurement delay and the like, it is preferable to avoid decoding of a PBCH payload of each neighbor cell to acquire the SSB index.

The inventors of the present invention noted that actually important with respect to the RRM measurement report about a neighbor cell is a beam index (effective SSB index) of an SSB of the neighbor cell. In one Embodiment, a UE acquires an effective SSB index based on a sequence of a DMRS of a PBCH. For example, the sequence of the DMRS of the PBCH may be generated based on the effective SSB index. By this means, since it is possible to identify the effective SSB index based on only the DMRS, the UE may omit decoding of the PBCH.

In other words, with respect to a detected predetermined cell and a neighbor cell with the same frequency as the predetermined cell, the UE acquires the effective SSB index, without acquiring the SSB index, and may perform one of cell identification and RRM measurement.

In performing a measurement report of power or quality of a neighbor call in RRM measurement, the UE may use the effective SSB index as an SSB index (beam index).

The maximum number of effective SSB indexes may be a predetermined number (e.g., "8"). In other words, the maximum value of the effective SSB index may be a value (e.g., $8-1=7$) obtained by subtracting "1" from the predetermine number. The maximum number of the effective SSB index may be defined by specifications, or may be notified by higher layer signaling and the like.

The UE may assume that there is a possibility of using the same effective SSB index in different SSB candidate positions (location indexes) within a DRS transmission window.

Further, the inventors of the present invention conceived of including information for a UE to derive frame timing (or half-frame timing) in a PBCH payload, and transmitting common PBCH payloads over SSBs in a burst. By making PBCH payloads common in different SSBs in an SS burst also in the unlicensed frequency, it is possible to facilitate soft-combining of PBCHs in the burst, and to prevent deterioration of PBCH detection characteristics, deterioration of detection delay and the like.

The payload of the PBCH transmitted within a DRS transmission window may include at least one of the following (1) and (2):

(1) information on the number of SSB candidate positions (location indexes) for which the same effective SSB index is repeated (or which may be offset information on from a start location index of an SSB burst to a location index where an execution SSB index 0 is transmitted), and (2) information on an SSB candidate position index where transmission of an SSB burst is started.

The UE may derive frame timing based on the effective SSB index obtained from the sequence of the DMRS of the PBCH, and at least one of these pieces of information (1) and (2). In addition, in frame timing derivation, half-frame index information used conventionally may be used.

For example, the information of above-mentioned (1) may be called information on the number of transmission effective SSB indexes, information on a maximum value of the effective SSB index, information on a periodicity of the effective SSB index, information on a unit of wrap around (or wrapping around), information on a repetition transmission unit of the SSB, information on a length of an SSB burst and the like. In addition, the wrap around may mean that an index such as the effective SSB index returns to "0" after reaching the maximum value.

For example, the information of above-mentioned (2) may be called a burst start SSB candidate position index, burst start location index and the like.

Based on the above-mentioned number of transmission effective SSB indexes, with respect to the detected cell and a neighbor cell (at least a cell of the same operator) with the same frequency, the UE may identify (determine) a location index that corresponds to the effective SSB index within a DRS transmission window.

Based on the above-mentioned burst start location index, the UE may identify (determine) half-frame timing of the detected cell and the neighbor cell with the same frequency. In addition, in the present disclosure, the half-frame timing, frame timing, slot timing and the like may be read with one another.

The above-mentioned number of transmission effective SSB indexes and the above-mentioned burst start location index are the same within a single DRS transmission window. Therefore, these pieces of information may be included in MIB in the payload of the PBCH to be notified to the UE, or may be notified to the UE as information except the MIB in the payload of the PBCH.

By thus constituting each piece of information, in a PBCH Transmission Time Interval (PBCH TII), since the content of the PBCH is the same, the UE is capable of performing combining reception on each PBCH in the PBCH Transmission Time Interval, and it is possible to improve the reception quality. In addition, for example, the PBCH TTI may be 40 ms, 80 ms and the like.

In addition, the information on the above-mentioned number of transmission effective SSB indexes is not limited to the PBCH or MIB, and may be notified to the UE using at least one of SIB (e.g., SIB1), RRC signaling and the like.

In the case of supporting Stand-Alone of NR-U, in initial access, the UE may assume a predetermined value defined by specifications, as the above-mentioned number of transmission effective SSB indexes. This is because in the case where the UE derives the effective SSB index (in other words, a pattern of the DMRS of the PBCH) astride a transmission periodicity of the DRS or a transmission periodicity of the SSB using combining reception, it is preferable that the UE is capable of performing processing, while assuming that the number of transmission effective SSB indexes is the predetermined value.

In addition, in the present disclosure, the UE may assume that the SSB index notified using ssb-PositionsInBurst means the effective SSB index.

FIGS. 10A to 10C and FIGS. 11A to 11C are diagrams showing one example of identification of the effective SSB index in one Embodiment. This example describes the case of using effective SSB indexes #0 to #3. In other words, the number of transmission effective SSB indexes (length of the SSB burst) is "4".

Figure 10:
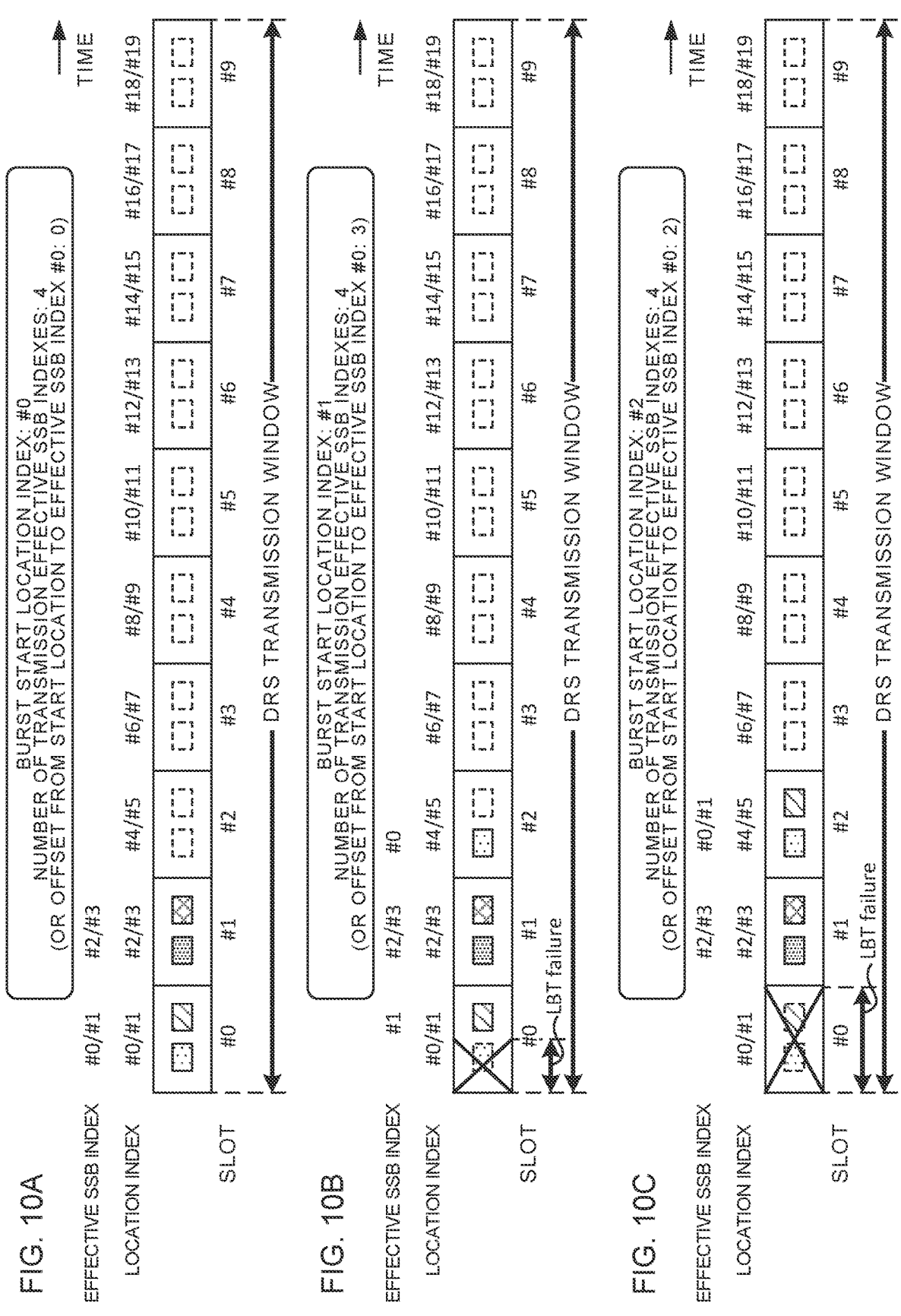
FIGS. 10A to 10C are diagrams showing one example of identification of an effective SSB index in one Embodiment.

In FIG. 10A, the base station succeeds in LBT from the beginning within a DRS transmission window, and using effective SSB indexes #0, #1, #2 and #3, transmits SSBs in respective location indexes #0, #1, #2 and #3. Further, PBCHs of the SSBs include information indicative of burst start location index=#0, and information indicative of the number of transmission effective SSB indexes=4 (or, offset from the start location to the effective SSB index #0=0).

In FIG. 10B, in a location index #0, the SSB is not transmitted due to an LBT failure. Using effective SSB indexes #1, #2, #3 and #0, the base station transmits SSBs in respective location indexes #1, #2, #3 and #4. Further, PBCHs of the SSBs include information indicative of burst start location index=#1, and information indicative of the number of transmission effective SSB indexes=4 (or, offset from the start location to the effective SSB index #0=3).

In FIG. 10C, in location indexes #0 and #1, the SSB is not transmitted due to an LBT failure. Using effective SSB indexes #2, #3, #0 and #1, the base station transmits SSBs in respective location indexes #2, #3, #4 and #5. Further, PBCHs of the SSBs include information indicative of burst start location index=#2, and information indicative of the number of transmission effective SSB indexes=4 (or, offset from the start location to the effective SSB index #0=2).

Figure 11:
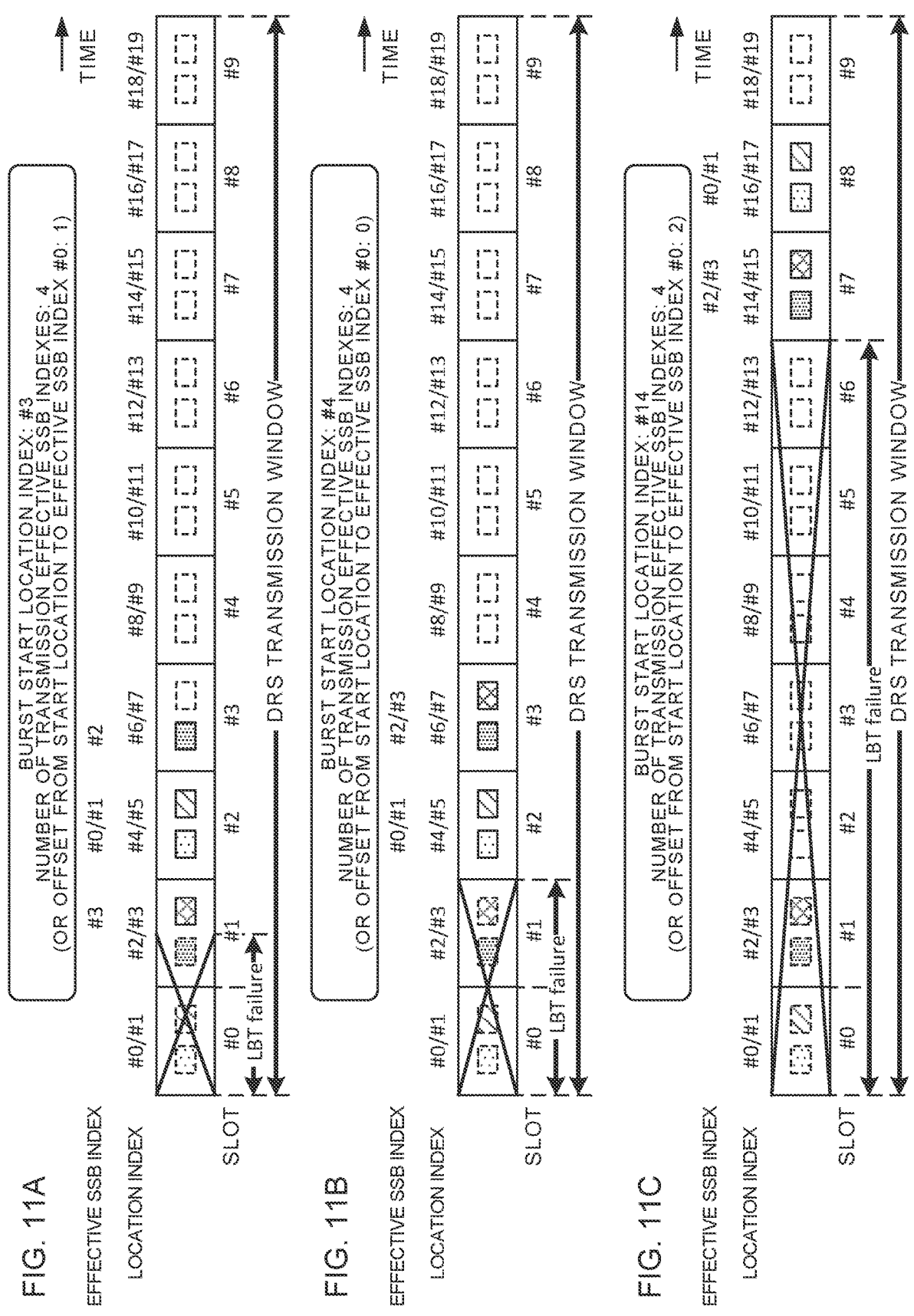
FIGS. 11A to 11C are diagrams showing one example of identification of the effective SSB index in one Embodiment.

In FIG. 11A, in location indexes #0 to #2, the SSB is not transmitted due to an LBT failure. Using effective SSB indexes #3, #0, #1 and #2, the base station transmits SSBs in respective location indexes #3, #4, #5 and #6. Further, PBCHs of the SSBs include information indicative of burst start location index=#3, and information indicative of the number of transmission effective SSB indexes=4 (or, offset from the start location to the effective SSB index #0=1).

In FIG. 11B, in location indexes #0 to #3, the SSB is not transmitted due to an LBT failure. Using effective SSB indexes #0, #1, #2 and #3, the base station transmits SSBs in respective location indexes #4, #5, #6 and #7. Further, PBCHs of the SSBs include information indicative of burst start location index=#4, and information indicative of the number of transmission effective SSB indexes=4 (or, offset from the start location to the effective SSB index #0=0).

In FIG. 11C, in location indexes #0 to #13, the SSB is not transmitted due to an LBT failure. Using effective SSB indexes #2, #3, #0 and #1, the base station transmits SSBs in respective location indexes #14, #15, #16 and #17. Further, PBCHs of the SSBs include information indicative of burst start location index=#14, and information indicative of the number of transmission effective SSB indexes=4 (or, offset from the start location to the effective SSB index #0=2).

When the UE detects the SSB, the UE decodes the PBCH, and grasps the burst start location index and the number of transmission effective SSB indexes (or, the above-mentioned offset). The UE may derive the effective SSB index based on the number of transmission effective SSB indexes (or, the above-mentioned offset) and a sequence of a DMRS of the PBCH included in the SSB.

In these examples, since the number of transmission effective SSB indexes is "4", the UE may assume that effective SSB indexes #0, #1, #2 and #3 correspond to location indexes #4i (i=0, 1, . . . ), #4i+1, #4i+2 and #4i+3. In addition, with respect to SSBs of different location indexes that correspond to the same effective SSB index, the UE may apply the same QCL assumption.

Further, based on the effective SSB index and burst start location index, the UE may identify a location index of the detected SSB. Then, based on the location index of the SSB, the UE may derive frame timing.

For example, in the case where the UE acquires an effective SSB index #3 from the DMRS sequence of the PBCH of the received SSB and the burst start location index indicated by the decoded PBCH is #14, the UE is capable of assuming that the SSB burst as shown in FIG. 11C is transmitted. Further, in the case where the UE acquires an effective SSB index #3 and the burst start location index indicated by the decoded PBCH is #1, the UE is capable of assuming that the SSB burst as shown in FIG. 10B is transmitted.

In addition, in Embodiment 2, even in the case where the base station transmits the same beam repeatedly a plurality of times successively in an SSB burst, it is necessary to vary the effective SSB index of each SSB such as #0, #1, #2, . . . in the SSB burst. This is because it is not possible to identify frame timing when the same effective SSB index exists in the SSB burst. Accordingly, there is a possibility of using the same beam (i.e., resulting in QCL) even in SSBs of different effective SSB indexes.

Therefore, the UE may be notified of information on the QCL relationship between different effective SSB indexes, using higher layer signaling (e.g., SIB, RRC signaling, etc.), physical layer signaling (e.g., DCI) or combination thereof. Based on the information, the UE may determine whether to be able to apply the same QCL assumption to different effective SSB indexes, whether to apply a different QCL assumption and the like. According to such a configuration, in the case where the base station repeatedly transmits the same beam, the UE side also grasps the case, and is capable of implementing averaging of measurement results of a plurality of SSBs based on the same beam in the SSB burst.

According to one Embodiment described above, it is possible to properly judge the QCL assumption between SSB indexes. Further, based on the PBCH of the SSB, the UE is capable of suitably deriving frame timing.

(Radio Communication System)

A configuration of a radio communication system according to one Embodiment of the present disclosure will be described below. In the radio communication system, communication is performed by using one of radio communication methods according to the respective above-mentioned Embodiments of the disclosure or combination thereof.

Figure 12:
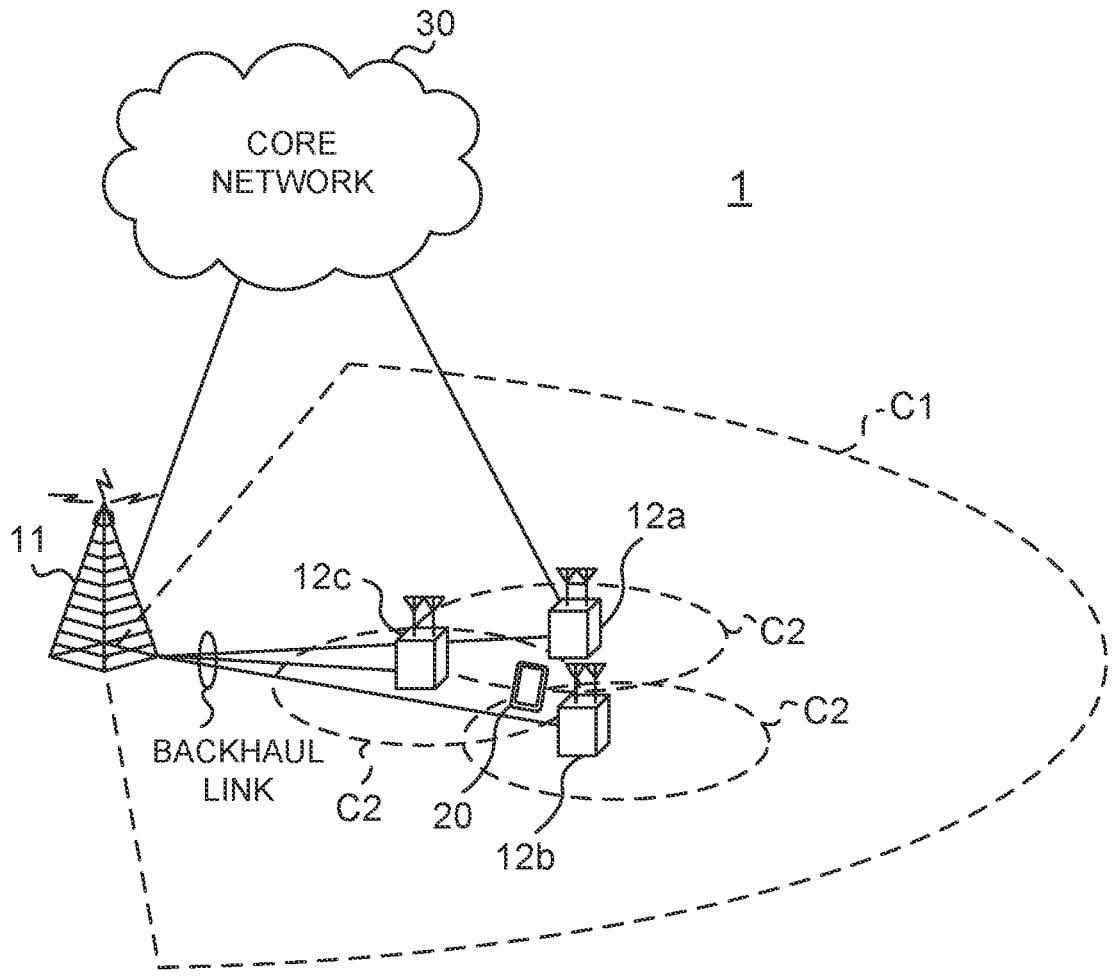
FIG. 12 is a diagram showing one example of a schematic configuration of a radio communication system according to one Embodiment.

FIG. 12 is a diagram showing one example of a schematic configuration of the radio communication system according to one Embodiment. The radio communication system 1 may be a system for actualizing communication using Long Term Evolution (LTE), 5th generation mobile communication system New Radio (5G NR) and the like specified by Third Generation Partnership Project (3GPP).

Further, the radio communication system 1 may support dual connectivity (Multi-RAT Dual Connectivity (MR-DC)) among a plurality of Radio Access Technologies (RAT). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and the like.

In EN-DC, a base station (eNB) of LTE (E-UTRA) is a master node (Master Node (MN)), and a base station (gNB) of NR is a secondary node (Secondary Node (SN)). In NE-DC, a base station (gNB) of NR is an MN, and a base station (eNB) of LTE (E-UTRA) is an SN.

The radio communication system 1 may support dual connectivity (e.g., dual connectivity (NR-NR Dual Connectivity (NN-DC) where both of the MN and SN are the base stations (gNB) of NR) among a plurality of base stations in the same RAT.

The radio communication system 1 may be provided with a base station 11 for forming a macrocell C1 with relatively wide coverage, and base stations 12 (12a to 12c) disposed inside the macrocell C1 to form small cells C2 narrower than the macrocell C1. A user terminal 20 may be positioned in at least one cell. The arrangement, numbers and the like of each cell and user terminal 20 are not limited to the aspect shown in the figure. Hereinafter, in the case of not distinguishing between the base stations 11 and 12, the stations are collectively called a base station 10.

The user terminal 20 may connect to at least one of a plurality of base stations 10. The user terminal 20 may use at least one of carrier aggregation (Carrier Aggregation (CA)) using a plurality of component carriers (Component Carrier (CC)) and dual connectivity (DC).

Each CC may be included in at least one of a first frequency band (Frequency Range 1 (FR1)) and second frequency band (Frequency Range 2 (FR2)). The macrocell C1 may be included in the FR1, and the small cell C2 may be included in the FR2. For example, the FR1 may be a frequency band (sub-6 GHz) of 6 GHz or less, and the FR2 may be a high frequency band (above-24 GHz) higher than 24 GHz. In addition, the frequency bands, definitions and the like of the FR1 and FR2 are not limited thereto, and for example, the FR1 may correspond to a frequency band higher than the FR2.

Further, in each CC, the user terminal 20 may perform communication using at least one of Time Division Duplex (TDD) and Frequency Division Duplex (FDD).

A plurality of base stations 10 may be connected by cables (e.g., optical fiber in conformity with Common Public Radio Interface (CPRI), X2 interface, etc.), or by radio (e.g., NR communication). For example, in the case of using NR communication as backhaul between the base stations 11 and 12, the base station 11 corresponding to a higher station may be called an Integrated Access Backhaul (IAB) donor, and the base station 12 corresponding to a relay station (relay) may be called an IAB node.

The base station 10 may be connected to a core network 30 via another base station 10 or directly. For example, the core network 30 may include at least one of Evolved Packet Core (EPC), 5G Core Network (5GCN), Next Generation Core (NGC) and the like.

The user terminal 20 may be a terminal supporting at least one of communication schemes such as LTE, LTE-A, and 5G.

In the radio communication system 1, an Orthogonal Frequency Division Multiplexing (OFDM)-based radio access scheme may be used. For example, on at least one of downlink (Downlink (DL)) and uplink (Uplink (UL)) may be used Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA) and the like.

The radio access scheme may be called a waveform. In addition, in the radio communication system 1, another radio access scheme (e.g., another single carrier transmission scheme, another multi-carrier transmission scheme) may be used for the radio access scheme of UL and DL.

As downlink channels, in the radio communication system 1 may be used a downlink shared channel (Physical Downlink Shared Channel (PDSCH)) shared by user terminals 20, broadcast channel (Physical Broadcast Channel (PBCH)), downlink control channel (Physical Downlink Control Channel (PDCCH)) and the like.

Further, as uplink channels, in the radio communication system 1 may be used an uplink shared channel (Physical Uplink Shared Channel (PUSCH)) shared by user terminals 20, uplink control channel (Physical Uplink Control Channel (PUCCH)), random access channel (Physical Random Access Channel (PRACH)) and the like.

User data, higher layer control information, System Information Block (SIB) and the like are transmitted on the PDSCH. The user data, higher layer control information and the like may be transmitted on the PUSCH. Further, Master Information Block (MIB) may be transmitted on the PBCH.

Lower layer control information may be transmitted on the PDCCH. For example, the lower layer control information may include downlink control information (Downlink Control Information (DCI)) including scheduling information of at least one of the PDSCH and PUSCH.

In addition, DCI for scheduling the PDSCH may be called a DL assignment, DL DCI and the like, and DCI for scheduling the PUSCH may be called a UL grant, UL DCI and the like. In addition, the PDSCH may be read with DL data, and the PUSCH may be read with UL data.

For detection of the PDCCH, a control resource set (COntrol REsource SET (CORESET)) and search space may be used. The CORESET corresponds to resources to search for the DCI. The search space corresponds to a search region and search method of PDCCH candidates. One CORE SET may be associated with one or a plurality of search spaces. The UE may monitor the CORESET related to some search space based on search space configuration.

One search space may correspond to PDCCH candidates corresponding to one or a plurality of aggregation levels. One or a plurality of search spaces may be called a search space set. In addition, the "search space", "search space set", "search space configuration", "search space set configuration", "CORESET", "CORESET configuration" and the like of the present disclosure may be read with one another.

On the PUCCH may be transmitted uplink control information (Uplink Control Information (UCI)) including at least one of Channel State Information (CSI), receipt confirmation information (for example, which may be called Hybrid Automatic Repeat reQuest ACKnowledgement (HARQ-ACK), ACK/NACK and the like) and Scheduling Request (SR). A random access preamble to establish connection with the cell may be transmitted on the PRACH.

In addition, in the present disclosure, the downlink, uplink and the like may be expressed without attaching "link". Further, various channels may be expressed without attaching "Physical" at the beginning.

In the radio communication system 1 may be transmitted a Synchronization Signal (SS), Downlink Reference Signal (DL-RS) and the like. As the DL-RS, in the radio communication system 1 may be transmitted a Cell-specific Reference Signal (CRS), Channel State Information Reference Signal (CSI-RS), demodulation reference signal (Demodulation Reference Signal (DMRS)), Positioning Reference Signal (PRS), Phase Tracking Reference Signal (PTRS) and the like.

For example, the synchronization signal may be at least one of a Primary Synchronization Signal (PSS) and Secondary Synchronization Signal (SSS). A signal block including the SS (PSS, SSS) and PBCH (and DMRS for the PBCH) may be called an SS/PBCH block, SS Block (SSB) and the like. In addition, the SS, SSB and the like may also be called the reference signal.

Further, in the radio communication system 1, a Sounding Reference Signal (SRS), demodulation reference signal (DMRS) and the like may be transmitted as an Uplink Reference Signal (UL-RS). In addition, the DMRS may be called a user terminal-specific reference signal (UE-specific Reference Signal).

(Base Station)

Figure 13:
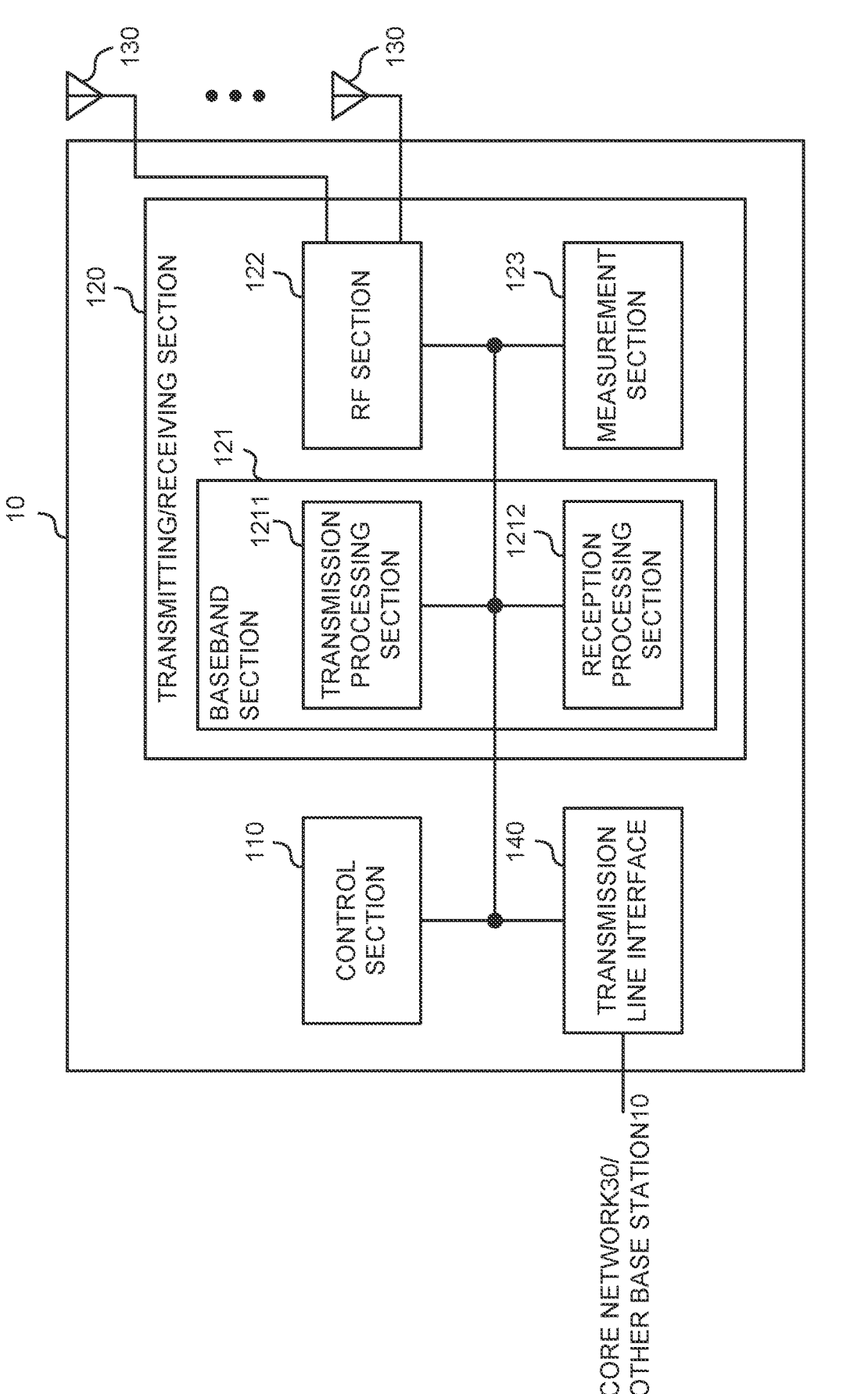
FIG. 13 is a diagram showing one example of a configuration of a base station according to one Embodiment.

FIG. 13 is a diagram showing one example of a configuration of the base station according to one Embodiment. The base station 10 is provided with a control section 110, transmitting/receiving section 120, transmitting/receiving antennas 130, and transmission line interface 140. In addition, the base station may be provided with one or more of each of the control section 110, transmitting/receiving section 120, transmitting/receiving antenna 130, and transmission line interface 140.

In addition, this example mainly illustrates function blocks of feature parts in this Embodiment, and the base station 10 may be assumed to have other function blocks required for radio communication. A part of processing of each section described below may be omitted.

The control section 110 performs control of the entire base station 10. The control section 110 is capable of being comprised of a controller, control circuit and the like explained based on common recognition in the technical field according to the present disclosure.

The control section 110 may control generation of signals, scheduling (e.g., resource allocation, mapping) and the like. The control section 110 may control transmission/reception, measurement and the like using the transmitting/receiving section 120, transmitting/receiving antenna 130 and transmission line interface 140. The control section 110 may generate data, control information, sequence and the like to transmit as a signal, and transfer the resultant to the transmitting/receiving section 120. The control section 110 may perform call processing (configuration, release, etc.) of a communication channel, state management of the base station 10, management of radio resources and the like.

The transmitting/receiving section 120 may include a baseband section 121, Radio Frequency (RF) section 122 and measurement section 123. The baseband section 121 may include a transmission processing section 1211 and reception processing section 1212. The transmitting/receiving section 120 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 120 may be comprised as an integrated transmitting/receiving section, or may be comprised of a transmitting section and a receiving section. The transmitting section may be comprised of a transmission processing section 1211 and RF section 122. The receiving section may be comprised of a reception processing section 1212, RF section 122, and measurement section 123.

The transmitting/receiving antenna 130 is capable of being comprised of an antenna, for example, an array antenna and the like explained based on the common recognition in the technical field according to the present disclosure.

The transmitting/receiving section 120 may transmit the above-mentioned downlink channel, synchronization signal, downlink reference signal and the like. The transmitting/receiving section 120 may receive the above-mentioned uplink channel, uplink reference signal and the like.

The transmitting/receiving section 120 may format least one of a transmission beam and reception beam, using digital beam forming (e.g., precoding), analog beam forming (e.g., phase rotation) and the like.

The transmitting/receiving section 120 (transmission processing section 1211) may perform, for example, on the data, control information and the like acquired from the control section 110, processing of Packet Data Convergence Protocol (PDCP) layer, processing (e.g., RLC retransmission control) of Radio Link Control (RLC) layer, processing (e.g., HARQ retransmission control) of Medium Access Control (MAC) layer and the like to generate a bit sequence to transmit.

The transmitting/receiving section 120 (transmission processing section 1211) may perform, on the bit sequence to transmit, transmission processing such as channel coding (which may include error correcting coding), modulation, mapping, filter processing, Discrete Fourier Transform (DFT) processing (as necessary), Inverse Fast Fourier Transform (IFFT) processing, precoding and digital-analog conversion, and output a baseband signal.

The transmitting/receiving section 120 (FR section 122) may perform modulation to a radio frequency band, filter processing, amplification and the like on the baseband signal to transmit a signal of the radio frequency band via the transmitting/receiving antenna 130.

On the other hand, the transmitting/receiving section 120 (RF section 122) may perform amplification, filter processing, demodulation to a baseband signal and the like on a signal of the radio frequency band received by the transmitting/receiving antenna 130.

The transmitting/receiving section 120 (reception processing section 1212) may apply reception processing such as analog-digital conversion, Fast Fourier Transform (FTT) processing, Inverse Discrete Fourier Transform (IDFT) processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 120 (measurement section 123) may perform measurement on a received signal. For example, based on the received signal, the measurement section 123 may perform Radio Resource Management (RRM) measurement, Channel State Information (CSI) measurement and the like. The measurement section 123 may measure received power (e.g., Reference Signal Received Power (RS RP)), received quality (e.g., Reference Signal Received Quality (RSRQ), Signal to Interference plus Noise Ratio (SINR), Signal to Noise Ratio (SNR)), signal strength (e.g., Received Signal Strength Indicator (RSSI)), propagation path information (e.g., CSI) and the like. The measurement result may be output to the control section 110.

The transmission line interface 140 may transmit/receive signals (backhaul signaling) to/from an apparatus included in the core network 30, another base station 10 and the like to perform acquisition, transmission and the like of user data (user plain data), control plain data and the like for the user terminal 20.

In addition, the transmitting section and receiving section of the base station 10 in the present disclosure may be comprised of at least one of the transmitting/receiving section 120, transmitting/receiving antenna 130 and transmission line interface 140.

In addition, the transmitting/receiving section 120 may transmit, to the user terminal 20, information (e.g., higher layer parameter "ssb-PositionsInBurst") on a position of a Synchronization Signal Block (SSB) in a Synchronization Signal (SS) burst.

The transmitting/receiving section 120 may transmit the SSB, DRS and the like.

(User Terminal)

Figure 14:
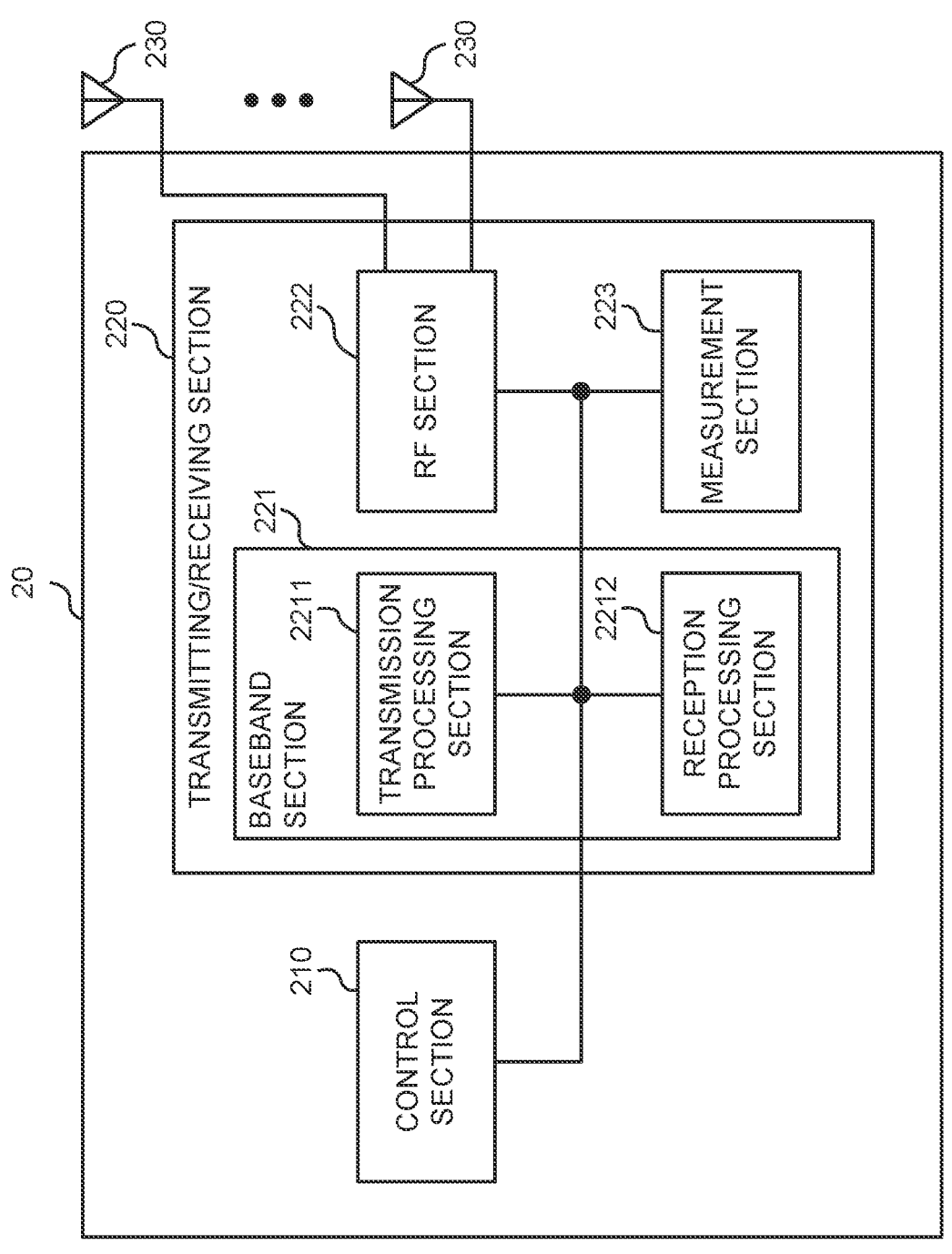
FIG. 14 is a diagram showing one example of a configuration of a user terminal according to one Embodiment.
Figure 15:
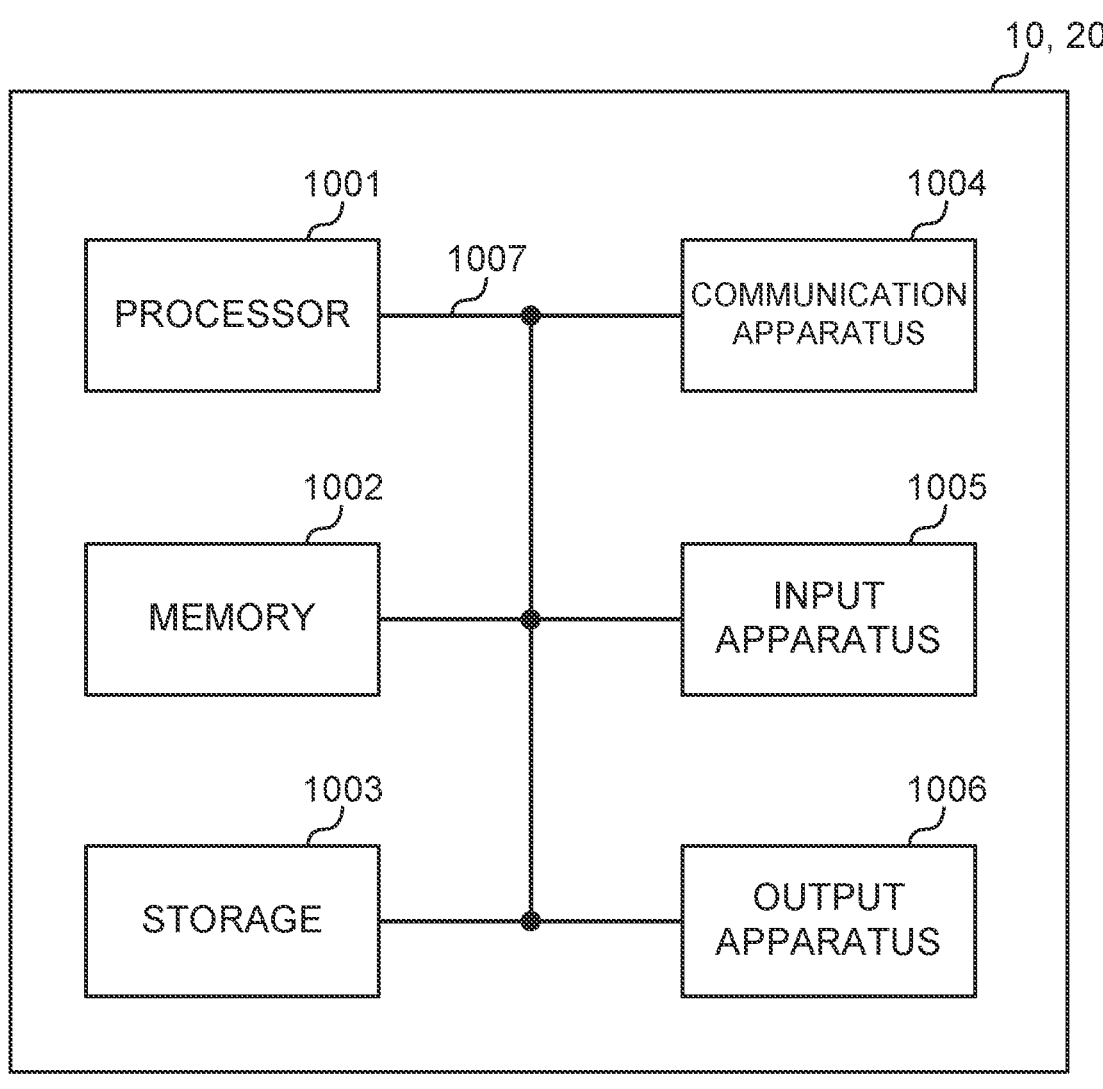
FIG. 15 is a diagram showing one example of hardware configurations of the base station and user terminal according to one Embodiment.

FIG. 14 is a diagram showing one example of a configuration of the user terminal according to one Embodiment. The user terminal 20 is provided with a control section 210, transmitting/receiving section 220, and transmitting/receiving antennas 230. In addition, the user terminal may be provided with one or more of each of the control section 210, transmitting/receiving section 220 and transmitting/receiving antenna 230.

In addition, this example mainly illustrates function blocks of feature parts in this Embodiment, and the user terminal 20 may be assumed to have other function blocks required for radio communication. A part of processing of each section described below may be omitted.

The control section 210 performs control of the entire user terminal 20. The control section 210 is capable of being comprised of a controller, control circuit and the like explained based on the common recognition in the technical field according to the present disclosure.

The control section 210 may control generation of signals, mapping and the like. The control section 210 may control transmission/reception, measurement and the like using the transmitting/receiving section 220 and transmitting/receiving antenna 230. The control section 210 may generate data, control information, sequence and the like to transmit as a signal, and transfer the resultant to the transmitting/receiving section 220.

The transmitting/receiving section 220 may include a baseband section 221, RF section 222 and measurement section 223. The baseband section 221 may include a transmission processing section 2211 and reception processing section 2212. The transmitting/receiving section 220 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 220 may be comprised as an integrated transmitting/receiving section, or may be comprised of a transmitting section and a receiving section. The transmitting section may be comprised of a transmission processing section 2211 and RF section 222. The receiving section may be comprised of a reception processing section 2212, RF section 222, and measurement section 223.

The transmitting/receiving antenna 230 is capable of being comprised of an antenna, for example, an array antenna and the like explained based on the common recognition in the technical field according to the present disclosure.

The transmitting/receiving section 220 may receive the above-mentioned downlink channel, synchronization signal, downlink reference signal and the like. The transmitting/receiving section 220 may transmit the above-mentioned uplink channel, uplink reference signal and the like.

The transmitting/receiving section 220 may format least one of a transmission beam and reception beam, using digital beam forming (e.g., precoding), analog beam forming (e.g., phase rotation) and the like.

The transmitting/receiving section 220 (transmission processing section 2211) may perform, for example, on the data, control information and the like acquired from the control section 210, processing of PDCP layer, processing (e.g., RLC retransmission control) of RLC layer, processing (e.g., HARQ retransmission control) of MAC layer and the like to generate a bit sequence to transmit.

The transmitting/receiving section 220 (transmission processing section 2211) may perform, on the bit sequence to transmit, transmission processing such as channel coding (which may include error correcting coding), modulation, mapping, filter processing, DFT processing (as necessary), IFFT processing, precoding and digital-analog conversion, and output a baseband signal.

In addition, whether or not to apply the DFT processing may be based on configuration of transform precoding. In the case where transform precoding is enabled about some channel (e.g., PUSCH), the transmitting/receiving section 220 (transmission processing section 2211) may perform the DFT processing as the above-mentioned transmission processing so as to transmit the channel using a DFT-s-OFDM waveform. In the other case, the section may not perform the DFT processing as the above-mentioned transmission processing.

The transmitting/receiving section 220 (FR section 222) may perform modulation to a radio frequency band, filter processing, amplification and the like on the baseband signal to transmit a signal of the radio frequency band via the transmitting/receiving antenna 230.

On the other hand, the transmitting/receiving section 220 (RF section 222) may perform amplification, filter processing, demodulation to a baseband signal and the like on a signal of the radio frequency band received by the transmitting/receiving antenna 230.

The transmitting/receiving section 220 (reception processing section 2212) may apply reception processing such as analog-digital conversion, FTT processing, IDFT processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 220 (measurement section 223) may perform measurement on a received signal. For example, based on the received signal, the measurement section 223 may perform RRM measurement, CSI measurement and the like. The measurement section 223 may measure received power (e.g., RSRP), received quality (e.g., RSRQ, SINR, SNR), signal strength (e.g., RSSI), propagation path information (e.g., CSI) and the like. The measurement result may be output to the control section 210.

In addition, the transmitting section and receiving section of the user terminal 20 in the present disclosure may be comprised of at least one of the transmitting/receiving section 220 and transmitting/receiving antenna 230.

In addition, the transmitting/receiving sect ion 220 may receive the information (e.g., higher layer parameter "ssb-PositionsInBurst") on a position of a Synchronization Signal Block (SSB) in a Synchronization Signal (SS) burst. For example, the information may be notified using at least one of System Information Block (SIB1) and RRC signaling.

Based on the information on the position of the SSB in the SS burst, the control section 210 may judge Quasi-Co-Location (QCL) assumption between SSB indexes within a transmission window of a Discovery Reference Signal (DRS) in a carrier (e.g., unlicensed carrier) to which listening is applied.

In addition, the listening-applied carrier may be called an LAA cell, LAA secondary cell (LAA SCell) and the like. In the listening-applied carrier, the user terminal 20 may perform listening before transmission. Herein, the "listening" in the present disclosure may be read with at least one of Listen Before Talk (LBT), Clear Channel Assessment (CCA), carrier sense, sensing, sensing of a channel, channel access procedure and the like.

The control section 210 may assume that an SSB that corresponds to each SSB index up to slots including an SSB that corresponds to a maximum SSB index indicated by the information on the position of the SSB in the SS burst is QCLed with an SSB that corresponds to an SSB index in a slot subsequent to the slots in the same order.

The control section 210 may assume that the QCL assumption of the SSB index is used repeatedly in a time period unit from a first slot of ssb-PositionsInBurst to a slot including the SSB that corresponds to the maximum SSB index, within a DRS transmission window. For example, the control section 210 may assume that the QCL assumption of the above-mentioned time period unit is applied from the next slot of the slot including the SSB that corresponds to the maximum SSB index.

In the slot including the SSB that corresponds to the maximum SSB index, the control section 210 may regard an SSB index larger than the maximum SSB index as Not-Available (may not count as the number of actually transmitted SSBs).

The control section 210 may assume that the number of Physical Downlink Control Channel (PDCCH) monitoring occasions for paging included in a paging occasion in the listening-applied carrier is determined based on the sum of the number of one or SSB indexes to be transmitted which is notified by the information on the position of the SSB in the SS burst, and the number of SSB indexes that are QCLed with the one or more SSB indexes.

Based on various types of QCL assumptions, the control section 210 may judge the QCL assumption between the SSB and the PDCCH in the PDCCH monitoring occasion to receive at least one of Other System Information (OSI) and paging, and monitor (or receive) the PDCCH. In addition, the OSI, paging and the like may be read with other information (e.g., particular DCI format).

The transmitting/receiving section 220 may receive (or detect) an SSB. Based on the DMRS of the PBCH included in the SSB, the control section 210 may acquire an effective SSB index. In this case, the control section 210 may omit acquisition of an SSB index with respect to the SSB, and for example, may omit decoding of the above-mentioned PBCH (may not perform).

From a payload of the PBCH, the control section 210 may acquire at least one of information on the number of effective SSB indexes to be transmitted, and a start location index of an SSB burst including the SSB within a DRS transmission window.

The control section 210 may apply soft-combining to decoding of a plurality of PBCHs in the SSB burst. The transmitting/receiving section 220 may perform combining reception on the plurality of PBCHs in the SSB burst.

(Hardware Configuration)

In addition, the block diagrams used in explanation of the above-mentioned Embodiments show blocks on a function-by-function basis. These function blocks (configuration sections) are actualized by any combination of at least one of hardware and software. Further, the method for actualizing each function block is not limited particularly. In other words, each function block may be actualized using a single apparatus combined physically or logically, or two or more apparatuses that are separated physically or logically are connected directly or indirectly (e.g., using cable, radio, etc.), and each function block may be actualized using a plurality of these apparatuses. The function block may be actualized by combining the above-mentioned one apparatus or the above-mentioned plurality of apparatuses and software.

Herein, the function includes judging, determining, deciding, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning and the like, but is not limited thereto. For example, the function block (configuration section) having the function of transmitting may be called a transmitting unit, transmitter and the like. In any case, as described above, the actualizing method is not limited particularly.

For example, each of the base station, user terminal and the like in one Embodiment of the present disclosure may function as a computer that performs the processing of the radiocommunication method of the disclosure. FIG. is a diagram showing one example of a hardware configuration of each of the base station and user terminal according to one Embodiment. Each of the base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the present disclosure, it is possible to read the letter of apparatus, circuit, device, section, unit and the like with one another. With respect to each apparatus shown in the figure, the hardware configuration of each of the base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by two or more processors at the same time, sequentially or using an other technique. In addition, the processor 1001 may be implemented on one or more chips.

For example, each function in the base station 10 and user terminal 20 is actualized in a manner such that predetermined software (program) is read on the hardware of processor 1001, memory 1002 and the like, and that the processor 1001 thereby performs computations, and controls communication via the communication apparatus 1004, and at least one of read and write of data in the memory 1002 and storage 1003.

For example, the processor 1001 operates an operating system to control the entire computer. The processor 1001 may be comprised of a Central Processing Unit (CPU) including interfaces with neighbor apparatuses, control apparatus, computation apparatus, register and the like. For example, at least a part of the above-mentioned control section 110 (210), transmitting/receiving section 120 (220) and the like may be actualized by the processor 1001.

Further, the processor 1001 reads the program (program code), software module, data and the like on the memory 1002 from at least one of the storage 1003 and the communication apparatus 1004, and according thereto, executes various kinds of processing. Used as the program is a program that causes the computer to execute at least a part of operation described in the above-mentioned Embodiments. For example, the control section 110 (210) may be actualized by a control program stored in the memory 1002 to operate in the processor 1001, and the other function blocks may be actualized similarly.

The memory 1002 is a computer-readable storage medium, and for example, may be comprised of at least one of Read Only Memory (ROM), Erasable Programmable ROM (EPROM), Electrically EPROM (EEPROM), Random Access Memory (RAM) and other proper storage media. The memory 1002 may be called the register, cache, main memory (main storage apparatus) and the like. The memory 1002 is capable of storing the program (program code), software module and the like executable to implement the radio communication method according to one Embodiment of the present disclosure.

The storage 1003 is a computer-readable storage medium, and for example, may be comprised of at least one of a flexible disk, floppy (Registered Trademark) disk, magneto-optical disk (e.g., compact disk (Compact Disc ROM (CD-ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via at least one of a wired network and a wireless network, and for example, is also referred to as a network device, network controller, network card, communication module and the like. For example, in order to actualize at least one of Frequency Division Duplex (FDD) and Time Division Duplex (TDD), the communication apparatus 1004 may be comprised by including a high-frequency switch, duplexer, filter, frequency synthesizer and the like. For example, the transmitting/receiving section 120 (220), transmitting/receiving antenna 130 (230) and the like as described above may be actualized by the communication apparatus 1004. The transmitting/receiving section 120 (220) may be made by physically or logically separated implementation using a transmitting section 120a (220a) and receiving section 120b (220b).

The input apparatus 1005 is an input device (e.g., keyboard, mouse, microphone, switch, button, sensor, etc.) that receives input from the outside. The output apparatus 1006 is an output device (e.g., display, speaker, Light Emitting Diode (LED) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between apparatuses.

Furthermore, each of the base station 10 and user terminal 20 may be configured by including hardware such as a microprocessor, Digital Signal Processor (DSP), Application Specific Integrated Circuit (ASIC), Programmable Logic Device (PLD), and Field Programmable Gate Array (FPGA), or a part or the whole of each function block may be actualized using the hardware. Forex ample, the processor 1001 may be implemented using at least one of the hardware.

(Modification)

In addition, the term explained in the present disclosure and the term required to understand the present disclosure may be replaced with a term having the same or similar meaning. For example, the channel, symbol and signal (or signaling) may be read with one another. Further, the signal may be a message. The reference signal is capable of being abbreviated as RS, and according to the standard to apply, may be called a pilot, pilot signal and the like. Furthermore, the component carrier (CC) may be called a cell, frequency carrier, carrier frequency and the like.

A radio frame may be comprised of one or a plurality of frames in the time domain. The one or each of the plurality of frames constituting the radio frame may be called a sub frame. Further, the sub frame may be comprised of one or a plurality of slots in the time domain. The subframe may be a fixed time length (e.g., 1 ms) that is not dependent on numerology.

Herein, the numerology may be a communication parameter applied to at least one of transmission and reception of some signal or channel. For example, the numerology may indicate at least one of SubCarrier Spacing (SCS), bandwidth, symbol length, cyclic prefix length, Transmission Time Interval (TTI), the number of symbols per TTI, radio frame configuration, particular filtering processing performed by a transmitter/receiver in the frequency domain, particular windowing processing performed by a transmitter/receiver in the time domain and the like.

The slot may be comprised of one or a plurality of symbols (Orthogonal Frequency Division Multiplexing (OFDM) symbols, Single Carrier Frequency Division Multiple Access (SC-FDMA) symbols and the like) in the time domain. Further, the slot may a time unit based on numerology.

The slot may include a plurality of mini-slots. Each mini-slot may be comprised of one or a plurality of symbols in the time domain. Further, the mini-slot may be called a subslot. The mini-slot may be comprised of the number of symbols lower than the slot. A PDSCH (or PUSCH) transmitted in a time unit larger than the mini-slot may be called PDSCH (PUSCH) mapping type A. A PDSCH (or PUSCH) transmitted using the mini-slot may be called PDSCH (PUSCH) mapping type B.

Each of the radio frame, subframe, slot, mini-slot and symbol represents a time unit in transmitting a signal. For the radio frame, subframe, slot, mini-slot and symbol, another name corresponding to each of them may be used. The time units such as the frame, subframe, slot, mini-slot and symbol in the present disclosure may be read with one another.

For example, one subframe may be called TTI, a plurality of contiguous subframes may be called TTI, or one slot or one mini-slot may be called TTI. In other words, at least one of the subframe and TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block, codeword and the like, or may be a processing unit of scheduling, link adaptation and the like. In addition, when the TTI is given, a time segment (e.g., the number of symbols) to which the transport block, code block, codeword and the like are actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in 3GPP LTE Rel.8-12), normal TTI, long TTI, ordinary subframe, normal subframe, long subframe, slot and the like. The TTI shorter than the ordinary TTI may be called shortened TTI, short TTI, partial or fractional TTI, shortened subframe, short subframe, mini-slot, subslot, slot and the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. The number of subcarriers contained in the RB may be the same irrespective of the numerology, and for example, may be "12". The number of subcarriers contained in the RB may be determined based on the numerology Further, the RB may include one or a plurality of symbols in the time domain, and may be a length of 1 slot, 1 mini-slot, 1 subcarrier, or 1 TTI. Each of 1 TTI, 1 sub frame and the like may be comprised of one or a plurality of resource blocks.

In addition, one or a plurality of RBs may be called a physical resource block (Physical RB (PRB)), subcarrier group (Sub-Carrier Group (SCG)), Resource Element Group (REG), PRB pair, RB pair and the like.

Further, the resource block may be comprised of one or a plurality of resource elements (Resource Element (RE)). For example, 1 RE may be a radio resource region of 1 subcarrier and 1 symbol.

A Bandwidth Part (BWP) (which may be called a partial bandwidth, etc.) may represent a subset of contiguous common RBs (common resource blocks) for some numerology in some carrier. Herein, the common RB may be identified by an index of the RB with a common reference point of the carrier as reference. The PRB may be defined by some BWP, and may be numbered within the BWP.

The BWP may include UL BWP (BWP for UL) and DL BWP (BWP for DL). For a UE, one or a plurality of BWPs may be configured within one carrier.

At least one of configured BWPs may be active, and the UE may not assume that a predetermined signal/channel is transmitted and received outside the active BWP. In addition, the "cell", "carrier" and the like in the present disclosure may be read with the "BWP".

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present disclosure may be expressed using an absolute value, may be expressed using a relative value from a predetermined value, or may be expressed using another corresponding information. For example, the radio resource may be indicated by a predetermined index.

The names used in the parameter and the like in the present disclosure are not restrictive names in any respects. Further, equations and the like using these parameters may be different from those explicitly disclosed in the disclosure. It is possible to identify various channels (PUCCH, PDCCH, etc.) and information elements, by any suitable names, and therefore, various names assigned to these various channels and information elements are not restrictive names in any respects.

The information, signal and the like explained in the present disclosure may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output at least one of from a higher layer to a lower layer, and from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiment described in the present disclosure, and may be performed using another method. For example, notification of the information in the disclosure may be performed using physical layer signaling (e.g., Downlink Control Information (DCI), Uplink Control Information (UCI)), higher layer signaling (e.g., Radio Resource Control (RRC) signaling, broadcast information (Master Information Block (MIB)), System Information Block (SIB) and the like), Medium Access Control (MAC) signaling), other signals, or combination thereof.

In addition, the physical layer signaling may be called Layer 1/Layer 2 (L1/L2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to explicit notification, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using at least one of wired techniques (coaxial cable, optical fiber cable, twisted pair, Digital Subscriber Line (DSL) and the like) and wireless techniques (infrared, microwave and the like), at least one of the wired technique and the wireless technique is included in the definition of the transmission medium.

The terms of "system" and "network" used in the present disclosure are capable of being used interchangeably. A "network" may mean an apparatus (e.g., base station) included in the network.

In the present disclosure, the terms of "precoding", "precoder", "weight (precoding weight)", "Quasi-Co-Location (QCL)", "Transmission Configuration Indication state (TCI state)", "spatial relation", "spatial domain filter", "transmit power", "phase rotation", "antenna port", "antenna port group", "layer", "the number of layers", "rank", "resource", "resource set", "resource group", "beam", "beam width", "beam angle", "antenna", "antenna element", "panel" and the like are capable of being used interchangeably.

In the present disclosure, the terms of "Base Station (BS)", "radio base station", "fixed station", "NodeB", "eNB (eNodeB)", "gNB (gNodeB)", "access point", "Transmission Point (TP)", "Reception Point (RP)", "Transmission/Reception Point (TRP)", "panel", "cell", "sector", "cell group", "carrier", "component carrier" and the like are capable of being used interchangeably. There is the case where the base station is called by the terms of macrocell, small cell, femto-cell, pico-cell and the like.

The base station is capable of accommodating one or a plurality of (e.g., three) cells. When the base station accommodates a plurality of cells, the entire coverage area of the base station is capable of being segmented into a plurality of smaller areas, and each of the smaller areas is also capable of providing communication services by a base station subsystem (e.g., small base station (Remote Radio Head (RRH)) for indoor use). The term of "cell" or "sector" refers to a part or the whole of coverage area of at least one of the base station and the base station sub-system that perform communication services in the coverage.

In the present disclosure, the terms of "Mobile Station (MS)", "user terminal", "User Equipment (UE)", "terminal" and the like are capable of being used interchangeably.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be called a transmitting apparatus, receiving apparatus, radio communication apparatus and the like. In addition, at least one of the base station and the mobile station may be a device installed in a mobile unit, mobile unit itself and the like. The mobile unit may be a vehicle (e.g., car, airplane, etc.), may be a mobile unit (e.g., drone, self-driving car, etc.) without human intervention, or may be a robot (crewed type or uncrewed type). In addition, at least one of the base station and the mobile station includes an apparatus that does always not move at the time of communication operation. For example, at least one of the base station and the mobile station may be an Internet of Things (IoT) device such as a sensor.

Further, the base station in the present disclosure may be read with the user terminal. For example, each Aspect/Embodiment of the disclosure may be applied to a configuration where communication between the base station and the user terminal is replaced with communication among a plurality of user terminals (for example, which may be called Device-to-Device (D2D), Vehicle-to-Everything (V2X), etc.). In this case, the functions that the above-mentioned base station 10 has may be the configuration that the user terminal 20 has. Further, the words of "up", "down" and the like may be read with a word (e.g., "side") that corresponds to Device-to-Device communication. For example, the uplink channel, downlink channel and the like may be read with a side channel.

Similarly, the user terminal in the present disclosure may be read with the base station. In this case, the functions that the above-mentioned user terminal 20 has may be the configuration that the base station 10 has.

In the present disclosure, operation performed by the base station may be performed by an upper node thereof in some case. In a network including one or a plurality of network nodes having the base station, it is obvious that various operations performed for communication with the terminal are capable of being performed by the base station, one or more network nodes (e.g., Mobility Management Entity (MME), Serving-Gateway (S-GW) and the like are considered, but the disclosure is not limited thereto) except the base station, or combination thereof.

Each Aspect/Embodiment explained in the present disclosure may be used alone, may be used in combination, or may be switched and used according to execution. Further, with respect to the processing procedure, sequence, flowchart and the like of each Aspect/Embodiment explained in the disclosure, unless there is a contradiction, the order may be changed. For example, with respect to the methods explained in the disclosure, elements of various steps are presented using illustrative order, and are not limited to the presented particular order.

Each Aspect/Embodiment explained in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (Registered Trademark)), CDMA 2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), system using another proper radio communication method, the next-generation system extended based thereon and the like. Further, a plurality of systems may be combined (e.g., combination of LTE or LTE-A and 5G, etc.) to apply.

The description of "based on" used in the present disclosure does not mean "based on only", unless otherwise specified. In other words, the description of "based on" means both of "based on only" and "based on at least".

Any references to elements using designations of "first", "second" and the like used in the present disclosure do not limit the amount or order of these elements overall. These designations are capable of being used in the disclosure as the useful method to distinguish between two or more elements. Accordingly, references of first and second elements do not mean that only two elements are capable of being adopted, or that the first element should be prior to the second element in any manner.

There is the case where the term of "determining" used in the present disclosure includes various types of operation. For example, "determining" may be regarded as "determining" judging, calculating, computing, processing, deriving, investigating, looking up (searching, inquiring) (e.g., looking up in a table, database or another data structure), ascertaining and the like.

Further, "determining" may be regarded as "determining" receiving (e.g., receiving information), transmitting (e.g., transmitting information), input, output, accessing (e.g., accessing data in memory) and the like.

Furthermore, "determining" may be regarded as "determining" resolving, selecting, choosing, establishing, comparing and the like. In other words, "determining" may be regarded as "determining" some operation.

Still furthermore, "determining" may be read with "assuming", "expecting", "considering" and the like.

The terms of "connected" and "coupled" used in the present disclosure or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present disclosure, in the case where two elements are connected, it is possible to consider that two elements are mutually "connected" or "coupled", by using one or more electric wires, cable, print electric connection, etc. and as some non-limited and non-inclusive examples, electromagnetic energy having wavelengths in a radio frequency region, microwave region and light (both visible and invisible) region, or the like.

In the present disclosure, the term of "A and B are different" may mean that "A and B are different from each other". In addition, the term may mean that "each of A and B is different from C". The terms of "separate", "coupled" and the like may be interpreted in the same manner as "different".

In the case of using "include", "including", and modifications thereof in the present disclosure, as in the term of "comprising", these terms are intended to be inclusive. Further, the term of "or" used in the disclosure is intended to be not exclusive OR.

In the present disclosure, in the case where articles are added by translation, for example, as "a", "an" and "the" in English, the disclosure may include that nouns continued from these articles are in the plural.

As described above, the invention according to the present disclosure is described in detail, but it is obvious to a person skilled in the art that the invention according to the disclosure is not limited to the Embodiments described in the disclosure. The invention according to the disclosure is capable of being carried into practice as modified and changed aspects without departing from the subject matter and scope of the invention defined by the descriptions of the scope of the claims. Accordingly, the descriptions of the disclosure are intended for illustrative explanation, and do not provide the invention according to the disclosure with any restrictive meaning.

The invention claimed is:

1. A terminal comprising:
a receiver that receives a synchronization signal block (SSB) based on a first higher layer parameter indicating a position of the SSB in a half frame; and
a processor that obtains, from candidate SSB indexes, an SSB index used for quasi-co-location (QCL) assumption of a plurality of SSBs indicated by the first higher layer parameter within a discovery signal transmission window, based on information on a maximum number of the SSB index indicated by a second higher layer parameter, the information of the maximum number of the SSB index being common among the plurality of SSBs in an unlicensed frequency band,
wherein the information on the maximum number of the SSB index indicated by the second higher layer parameter is transmitted commonly within the discovery signal transmission window.

2. The terminal according to claim 1, wherein the information is transmitted in master information block (MIB) transmitted on a physical broadcast channel (PBCH) included in the SSB.

3. A radio communication method for a terminal, comprising:
receiving a synchronization signal block (SSB) based on a first higher layer parameter indicating a position of the SSB in a half frame;
obtaining, from candidate SSB indexes, an SSB index used for quasi-co-location (QCL) assumption of a plurality of SSBs indicated by the first higher layer parameter within a discovery signal transmission window, based on information on a maximum number of the SSB index indicated by a second higher layer parameter, the information of the maximum number of the SSB index being common among the plurality of SSBs in an unlicensed frequency band; and
wherein the information on the maximum number of the SSB index indicated by the second higher layer parameter is transmitted commonly within the discovery signal transmission window.

4. A system comprising a terminal and a base station,
wherein the terminal comprises:
a receiver that receives a synchronization signal block (SSB) based on a first higher layer parameter indicating a position of the SSB in a half frame; and
a processor that obtains, from candidate SSB indexes, an SSB index used for quasi-co-location (QCL) assumption of a plurality of SSBs indicated by the first higher layer parameter within a discovery signal transmission window, based on information on a maximum number of the SSB index indicated by a second higher layer parameter, the information of the maximum number of the SSB index being common among the plurality of SSBs in an unlicensed frequency band, and
the base station comprises:
a transmitter that transmits the SSB,
wherein the information on the maximum number of the SSB index indicated by the second higher layer parameter is transmitted commonly within the discovery signal transmission window.

* * * * *